(12) United States Patent
Barnoski et al.

(10) Patent No.: US 7,311,449 B2
(45) Date of Patent: Dec. 25, 2007

(54) HIGH PRECISION OPTOELECTRONIC COMPONENTS

(75) Inventors: Michael K Barnoski, Pacific Palisades, CA (US); Anthony Levi, South Pasadena, CA (US); Fritz Prinz, Woodside, CA (US); Alex Tarasyuk, Los Angeles, CA (US)

(73) Assignee: Nanoprecision Products, Inc., Los Angeles, CA (US)

( * ) Notice: Subject to any disclaimer, the term of this patent is extended or adjusted under 35 U.S.C. 154(b) by 231 days.

(21) Appl. No.: 10/643,759

(22) Filed: Aug. 18, 2003

(65) Prior Publication Data
US 2004/0114877 A1 Jun. 17, 2004

Related U.S. Application Data

(63) Continuation-in-part of application No. 10/620,851, filed on Jul. 15, 2003.

(60) Provisional application No. 60/403,924, filed on Aug. 16, 2002, provisional application No. 60/403,925, filed on Aug. 16, 2002, provisional application No. 60/403,926, filed on Aug. 16, 2002.

(51) Int. Cl.
*G02B 6/36* (2006.01)
(52) U.S. Cl. ........................................ 385/78
(58) Field of Classification Search ............... 385/78
See application file for complete search history.

(56) References Cited

U.S. PATENT DOCUMENTS

| | | | |
|---|---|---|---|
| 2,336,982 A | 12/1943 | Cremer | |
| 3,568,555 A | 3/1971 | Stroh | |
| 3,861,192 A | 1/1975 | Suzuki et al. | |
| 3,972,585 A | 8/1976 | Dalgleish et al. | |
| 4,292,862 A | 10/1981 | Thompson | |
| 4,458,985 A | 7/1984 | Balliet et al. | |
| 4,524,582 A | 6/1985 | Lucas et al. | |
| 4,555,968 A | 12/1985 | Raney et al. | |
| 5,037,328 A * | 8/1991 | Karlovich | 439/578 |
| 5,113,736 A | 5/1992 | Meyerle | |

(Continued)

FOREIGN PATENT DOCUMENTS

EP 0201944 11/1986

(Continued)

OTHER PUBLICATIONS

Robertsson M E, et al., "Plastic Optical Connectors Molded Directly onto Optical Fibers and Optical Fiber Ribbons", IEEE, Jun. 1, 1993, pp. 498-504, New York, NY, USA.

(Continued)

*Primary Examiner*—Javaid H. Nasri
(74) *Attorney, Agent, or Firm*—Liu & Liu

(57) ABSTRACT

An optoelectronic assembly having components designed to be fabricated on a stamping process capable of producing parts having tolerances below 1000 nanometers. The optoelectronic assembly includes ferrules and sleeves. The ferrules can include two identical half ferrules that are forged and assembled together to form the ferrule body. The ferrules can also be designed to be alternatively produced by forming processes or produced by a combination of forging and forming processes. The pair of ferrules supporting one or more optical fibers are guided together by a high precision split sleeve for coupling the fibers together.

48 Claims, 30 Drawing Sheets

U.S. PATENT DOCUMENTS

| | | | |
|---|---|---|---|
| 5,195,153 A | 3/1993 | Finzel | |
| 5,319,728 A | 6/1994 | Lu et al. | 385/67 |
| 5,568,766 A | 10/1996 | Otremba et al. | |
| 5,647,042 A * | 7/1997 | Ochiai et al. | 385/56 |
| 5,902,326 A * | 5/1999 | Lessar et al. | 607/36 |
| 6,179,482 B1 | 1/2001 | Takizawa et al. | |
| 6,276,840 B1 | 8/2001 | Weiss et al. | |
| 6,283,644 B1 * | 9/2001 | Gilliland et al. | 385/93 |
| 6,311,597 B1 | 11/2001 | Schroth et al. | |
| 6,389,940 B1 | 5/2002 | Long et al. | |
| 6,416,334 B1 | 7/2002 | Plishner | |
| 6,505,535 B1 | 1/2003 | Kurita et al. | |
| 6,695,488 B2 * | 2/2004 | Grabbe | 385/78 |
| 2001/0051026 A1 | 12/2001 | Steinberg et al. | |
| 2003/0068142 A1 | 4/2003 | Brezina et al. | |
| 2003/0070518 A1 | 4/2003 | Kurita et al. | |

FOREIGN PATENT DOCUMENTS

| | | |
|---|---|---|
| EP | 0299098 | 1/1989 |
| EP | 0410181 | 1/1991 |
| EP | 0423581 | 4/1991 |
| EP | 0716322 | 6/1996 |

OTHER PUBLICATIONS

Partial International Search Report of Counterpart PCT Application No. PCT/US03/25940, May 5, 2004.

Partial International Search Report of Counterpart PCT Application No. PCT/US03/25939, no date.

"Uni-Guide® Die System FAQ's" by Humdinger, Inc., pp. 1-5, no date.

"Uni-Guide Die System, Patent Pending", Technical Discussion by Humdinger, Inc., pp. 1-6, no date.

"Tech Trends, Round Die Set Works with Worn Presses", www.sme.org/forming&fabricating—Apr. 2000, p. 18.

"A New Design for Die Sets", www.metalforming.com, Aug. 2000, p. 66.

"The Uni-Guide Die System", www.uni-guide.com, Uni-Guide Products Brochure, pp. 1-4.

Barnoski, Michael, Fundamentals of Optical Fiber Communications, 2nd Ed., 1981, pp. 172-183, Academic Press, Inc.

* cited by examiner

HIGH PRECISION OPTOELECTRONIC COMPONENTS

CROSS-REFERENCE

This application claims priority of the following: (a) U.S. Provisional Patent Application No. 60/403,925, filed on Aug. 16, 2002; (b) U.S. Provisional Patent Application No. 60/403,926, filed on Aug. 16, 2002; (c) U.S. Provisional Patent Application No. 60/403,924, filed on Aug. 16, 2002; and (d) U.S. patent application Ser. No. 10/620,851, filed on Jul. 15, 2003. These applications are fully incorporated by reference as if fully set forth herein.

BACKGROUND OF THE INVENTION

1. Field of the Invention

The present invention relates to optoelectronic assemblies, sub-assemblies and components, and more particularly to high tolerance components used to align optical fibers in single fiber and multi-fiber optical fiber connections.

2. Description of Related Art

Optical fiber based communication channels are the system of choice in many defense and commercial applications because of their high performance and small size. Particularly, fiber optics have "proved-in" in long distance applications, such as city-to-city and continent-to-continent communication spans, because of lower costs of electrical-to-optical-to-electrical (E-O-E) conversion components, fiber amplifiers, and fiber cables relative to pure electrical systems using coaxial copper cable that do not require E-O-E. These long haul fiber systems can have hundreds of kilometers of fiber between terminals.

Shorter distance systems typically have only a few tens of kilometers of fiber between terminals, and very short reach (VSR) systems have only a few tens of meters of fiber between terminals. Although fiber links for telecom and datacom in metro, access and premise areas are short as compared to long haul links, there are a great many of them. The number of components required in the deployment of fiber for these types of applications is large. In these short distance systems, fiber optics "prove-in" is very sensitive to the cost of E-O-E terminal conversion devices and supporting circuitry, as well as any passive and active optoelectronic devices and equipment linked between terminal ends. Consequently, for optoelectronic active and passive assemblies, sub-assemblies and components to "prove-in" in short distance and VSR systems, their average sell prices must be lowered. Lowering of the average sell prices will help stimulate the unit volume necessary to justify investment in high speed manufacturing technologies.

A significant element of the cost of both active and passive fiber components and connectorized cable is the fiber connector itself. Ferrules and associated means for aligning them (e.g., split sleeves for single fiber connection, ground pins for multi-fiber connections) dominate the cost of current fiber connectors. The alignment components are normally required to align fibers to active and passive devices and to align two fibers for demountable connection and for splicing. Precision alignment of two polished fiber ends is needed to ensure that overall optical loss in a fiber link is equal or less than the specified optical connector loss budget for a system. For single-mode telecommunication-grade fiber, this typically corresponds to connector fiber alignment tolerances that are less than 1000 nm. Connectors, in both parallel fiber and single fiber links, operating at multi-gigabit rates must be assembled with subcomponents fabricated with sub micron precision. As if producing parts with such precision levels were not challenging enough, for the resulting end product to be economical it must be done in a fully automated, very high-speed process.

Current connectors have not changed in basic design for more than 20 years. The basic designs of ferrules, split sleeves and grooves date back to the 1970's. Conventional ferrules are solid cylinders with a hole centered on the axis of the cylinder into which a fiber, typically 0.125 mm in diameter, is inserted and affixed. The outside diameter of the cylinder is typically 2.5 mm, and its length is typically 10 mm. For the most part, products on the market today incorporate these same designs but are made from different materials and made by different manufacturing methods. For single fiber-to-fiber applications, ferrules are typically made from machined-formed metal blanks or zirconia ceramics. In a multi-step process, zirconia blanks are molded to approximate sizes, and then the blanks are machined and grinded to the desired size and tolerances. For multi-fiber applications, ferrules are typically made from thermoset plastic impregnated with silica spheres. The silica spheres result in a thermal expansion coefficient of the composite plastic-glass material system closer to that of silica fibers than that of pure plastic. It is generally accepted that current fiber connectors cost too much to manufacture. The cost of manufacturing fiber connectors must decrease if fiber optic is to be the communication media of choice for short haul and VSR applications.

Stamping processes have been deployed in manufacturing processes for mass-producing parts at low cost. Stamping is a fabrication process that presses a work piece, such as a metal strip, between a die set assembly into a predetermined shape or pattern. The die set assembly can perform various stamping operations on the work piece, such as cutting, forming (e.g., punching, drawing, bending, flanging and hemming), and forging (e.g., coining). Generally, forming is referenced to a stamping operation that does not substantially alter the thickness of a work piece, while forging is referenced to a stamping operation that substantially alters the thickness of the work piece. Compared to the processes of machining molded zirconia blanks or molded silica impregnated thermoset plastic, stamping is a relatively faster process.

Stamping processes, however, have not been effective in producing parts With acceptable tolerances for optoelectronic components. U.S. Pat. No. 4,458,985 to Balliet et al. is directed to an optical fiber connector. Balliet describes in a cursory manner that some of the connector components can be produced by a coining or stamping process (e.g., col. 3, lines 20-21, 55-57). However, Balliet does not provide an enabling disclosure of such stamping process, let alone an enabling disclosure of a stamping process for producing parts within 1000 nm.

In our pending U.S. patent application Ser. No. [Not Yet Available], entitled "Stamping System for Manufacturing High Tolerance Parts," filed on Jul. 15, 2003, which is incorporated by reference in its entirety, we describe a system and process for stamping parts, such as optoelectronic assemblies, sub-assemblies and components, having tolerances within 1000 nm. FIG. 1 is a schematic drawing illustrating a system 10 for stamping optoelectronic components having tolerances below 1,000 nm. The stamping system 10 includes, in part, a stamping press 20, one or a progression of stamping stations 25, and an interface system 35. Each stamping station 25 can include tools, such as a punch and die for performing a specific stamping operation on a work piece, sensors for in-line metrology and/or tool protection, and other equipment, such as a welder. The stamping stations 25 include a novel structure for guiding the punch in substantial alignment with the die with tight tolerances. Also, the stamping stations 25 are designed to minimize the number of moving components involved in the support structure in guiding the punch to the die. The stamping press 20 powers the progression of stamping stations 25. The interface system 35 facilitates coupling the force of the press 20 with the punch but structurally decoupling the press 20 from the punch. The interface system 35 also allows isolation of each stamping station so that operation at one station does not affect operation at another station.

This precision stamping process is capable of producing parts with a "six sigma" geometrical tolerance band of 1,000 nm. Statistically, this means that at most only 3.4 parts per million will not meet dimensional requirements defined by the 1,000 nm tolerance band. For a normal distribution, to achieve a six sigma process, the standard deviation of the complete process must be less than or equal to 83 nm [(1000 nm/2)/6=83 nm], provided the mean of the process remains constant. In practice, an allowance must be made to accommodate shifts in the process mean. For the case where the shift in process mean of ±1.5*sigma is accommodated, the maximum standard deviation is reduced to 67 nm [(1000 nm/2)/7.5=67 nm]. Again, assuming normal statistics, to achieve this in a multistage process with n precision stages, each of the n-stages must have sigma/n^0.5. So if n=4 in this example, then sigma (per stage) is less than or equal to 33 nm.

It is therefore desirable to have precision optoelectronic assemblies, sub-assemblies and components that are designed for manufacturability in a high-speed stamping process capable of producing parts having tolerances within 1,000 nanometers. It is also desirable to have precision optoelectronic assemblies, sub-assemblies and components that are designed for manufacturability in the stamping system described in our pending U.S. patent application Ser. No. [NOT YET AVAILABLE].

BRIEF DESCRIPTION OF THE DRAWINGS

For a fuller understanding of the nature and advantages of the invention, as well as the preferred mode of use, reference should be made to the following detailed description read in conjunction with the accompanying drawings. In the following drawings, like reference numerals designate like or similar parts throughout the drawings.

SUMMARY OF THE INVENTION

Figure 1:
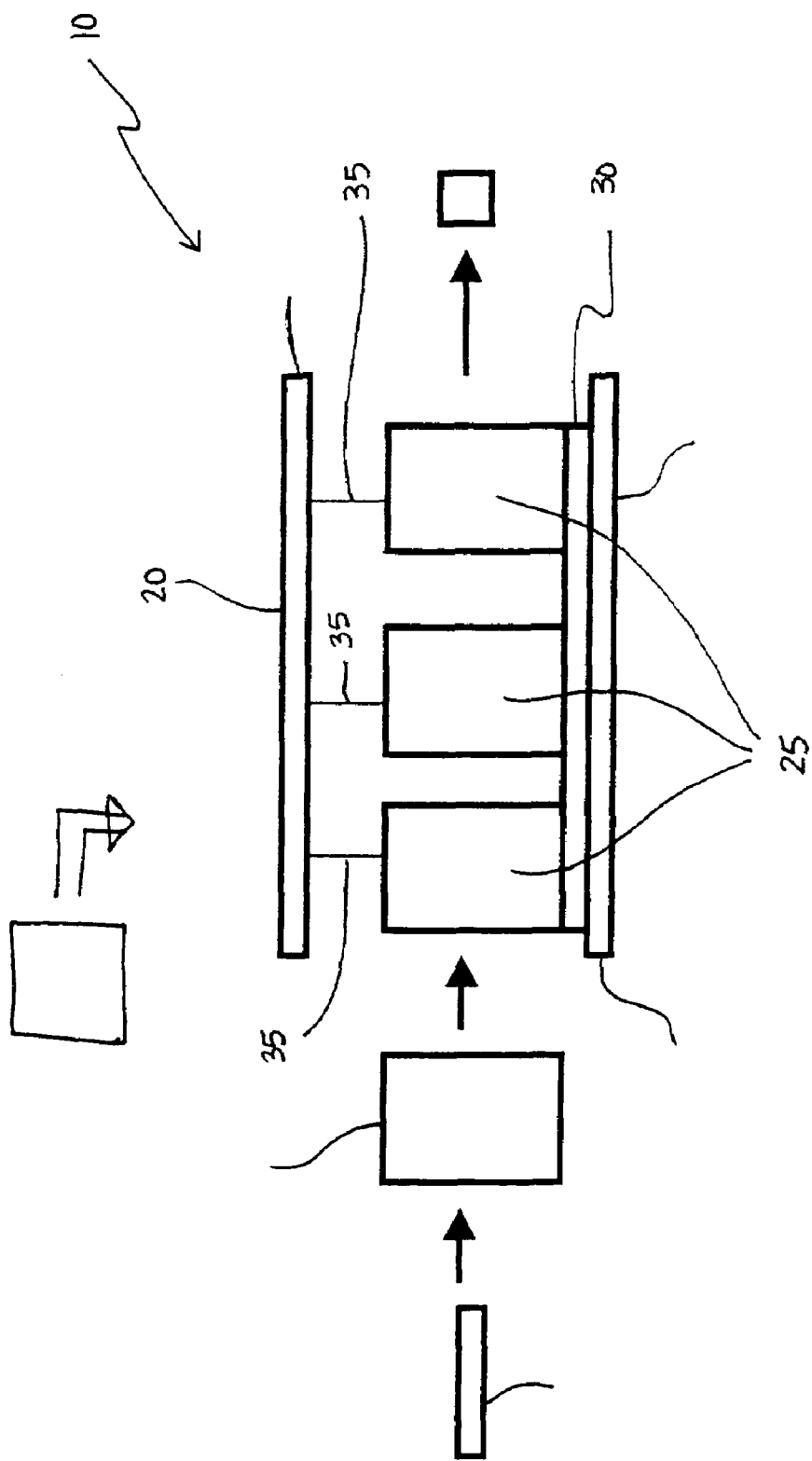
FIG. 1 is a schematic drawing illustrating a system for stamping optoelectronic components having tolerances below 1,000 nm.

The present invention is directed to optoelectronic assemblies, sub-assemblies and components that have novel designs, which lend themselves to manufacturability by high-speed stamping processes capable of producing parts having tolerances within 1000 nm. The inventive optoelectronic assemblies, sub-assemblies and components can be, but are not limited to, optical fiber connectors, such as precision ferrules and sleeves. The optoelectronic assembly of the present invention includes a pair of complementary ferrules, supporting one or more optical fiber ends, and a sleeve. The ferrules and the sleeve have sub-micron tolerances such that when the ferrules are inserted within the sleeve, the sleeve precisely aligns the fiber ends supported by the ferrules relative to each other for interconnection.

In one aspect of the present invention, the components of the optoelectronic assembly are designed for manufacturability by a forging process. In one embodiment, ferrules include two complementary half ferrules. Each half ferrule includes a planar surface having one or more grooves defined thereon. The grooves can be sized and shaped for nesting an optical fiber end or a guide pin. The shape of the half ferrules and the grooves can be formed by forging processes. The complementary half ferrules can be assembled together to form the ferrule. When the half ferrules are assembled together, the grooves define one or more shafts for nesting either optical fibers or guide pins. In some embodiments, the half ferrules have a semi-circular end cross-section. In some embodiments, the half ferrules have a partial semi-circular end cross-section.

In another aspect of the present invention, the components of the optoelectronic assembly are designed for manufacturability by a forming process. In one embodiment, ferrules having two or more points are produced by a forming process on a single sheet work piece. In some embodiments, the ferrule has a star shape. When inserted into a complementary sleeve, the points contact the inner surface of a sleeve to facilitate guiding the optical fibers relative to each other. In another embodiment, a sleeve is produced by a forming process on a single sheet work piece.

In a further aspect of the present invention, the components of the optoelectronic assembly are designed for manufacturability by forging and forming processes. In one embodiment, ferrules include two complementary half ferrules having a loop configuration. Each half ferrule includes a planar surface having one or more grooves defined thereon. The grooves can be sized and shaped for nesting an optical fiber end. The grooves can be formed by forging processes. The loop shape of the half ferrules can be produced by a forming process. The complementary half ferrules can be assembled together to form the ferrule. When the half ferrules are assembled together, the grooves define one or more shafts for nesting the optical fibers. In another embodiment, the ferrules are produced from assembling together individually formed and/or forged parts.

In still a further aspect of the present invention, the optoelectronic assembly includes a ferrule and a crimp member for fixedly holding a fiber strength member. In one embodiment, the ferrule is design to be produced by a forging process. In some embodiments, the ferrule includes two complementary half ferrules having grooves defined thereon. When the half ferrules are assembled together, the grooves define a shaft for supporting an optical fiber end. In some embodiments, the ferrule is designed to be produced by a forming process. In some embodiments, the ferrule has a star-shape produced by forming a single sheet work piece. The ferrule is attached to the crimp member. The crimp member includes a sleeve having a slit adapted to receive and fixedly hold the fiber strength member.

DETAILED DESCRIPTION OF THE PREFERRED EMBODIMENTS

This invention is described below in reference to various embodiments with reference to the figures. While this invention is described in terms of the best mode for achieving this invention's objectives, it will be appreciated by those skilled in the art that variations may be accomplished in view of these teachings without deviating from the spirit or scope of the invention.

The present invention is directed to a high precision optical fiber connector for aligning and coupling optical fibers together. The optical fiber connector includes high precision components for supporting and precisely aligning the optical fibers for interconnection. The components of the optical fiber connector are designed so that they can be manufactured by a high-speed stamping system and process capable of producing parts having tolerances below 1000 nm. For purposes of illustrating the principles of the present invention and not by limitation, the present invention is described by reference to embodiments directed to optoelectronic components, such as ferrules and split sleeves.

Full Semi-circle Half Ferrule

Figure 2:
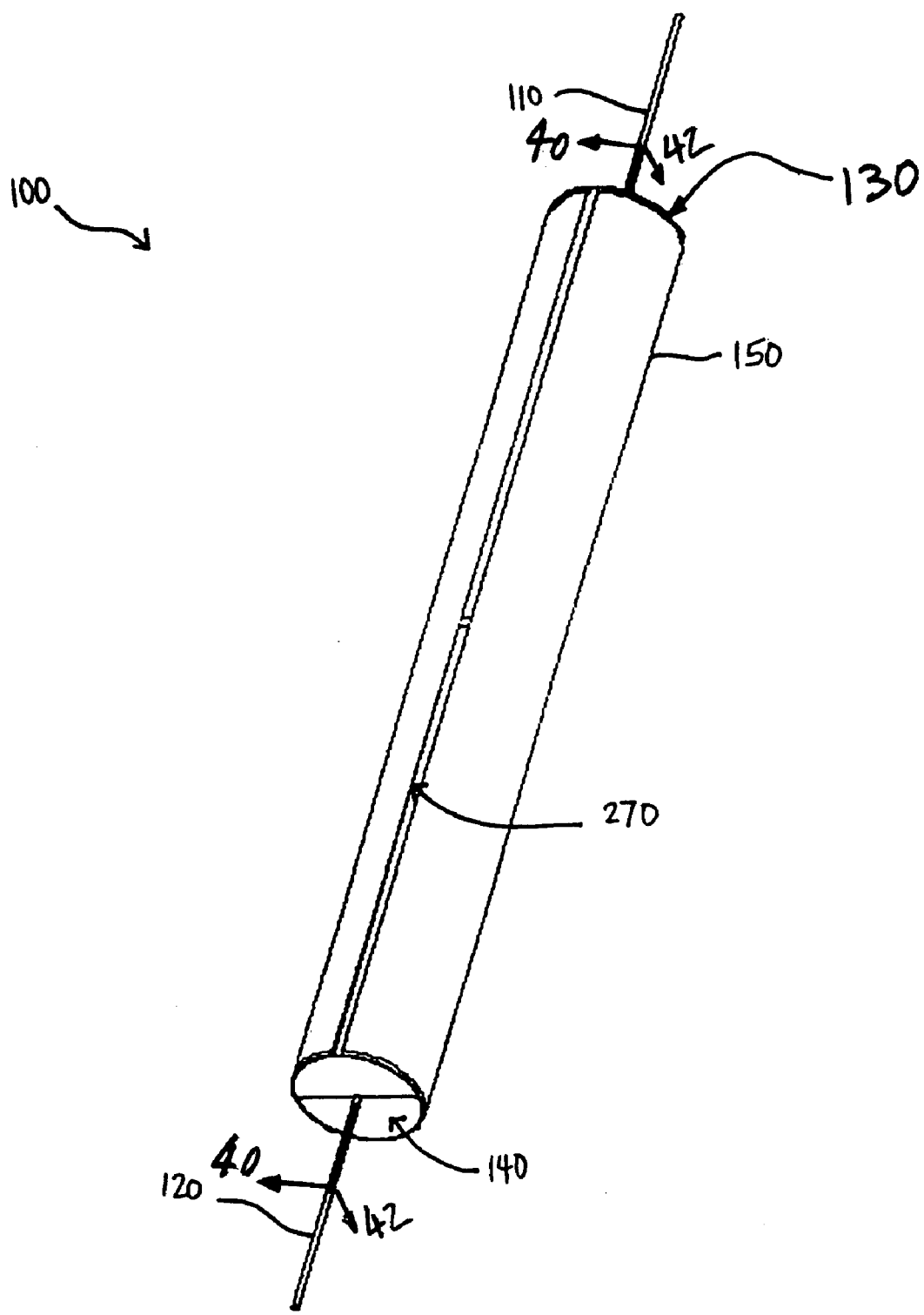
FIG. 2 is a perspective view of an optoelectronic assembly in accordance with one embodiment of the present invention.
Figure 3:
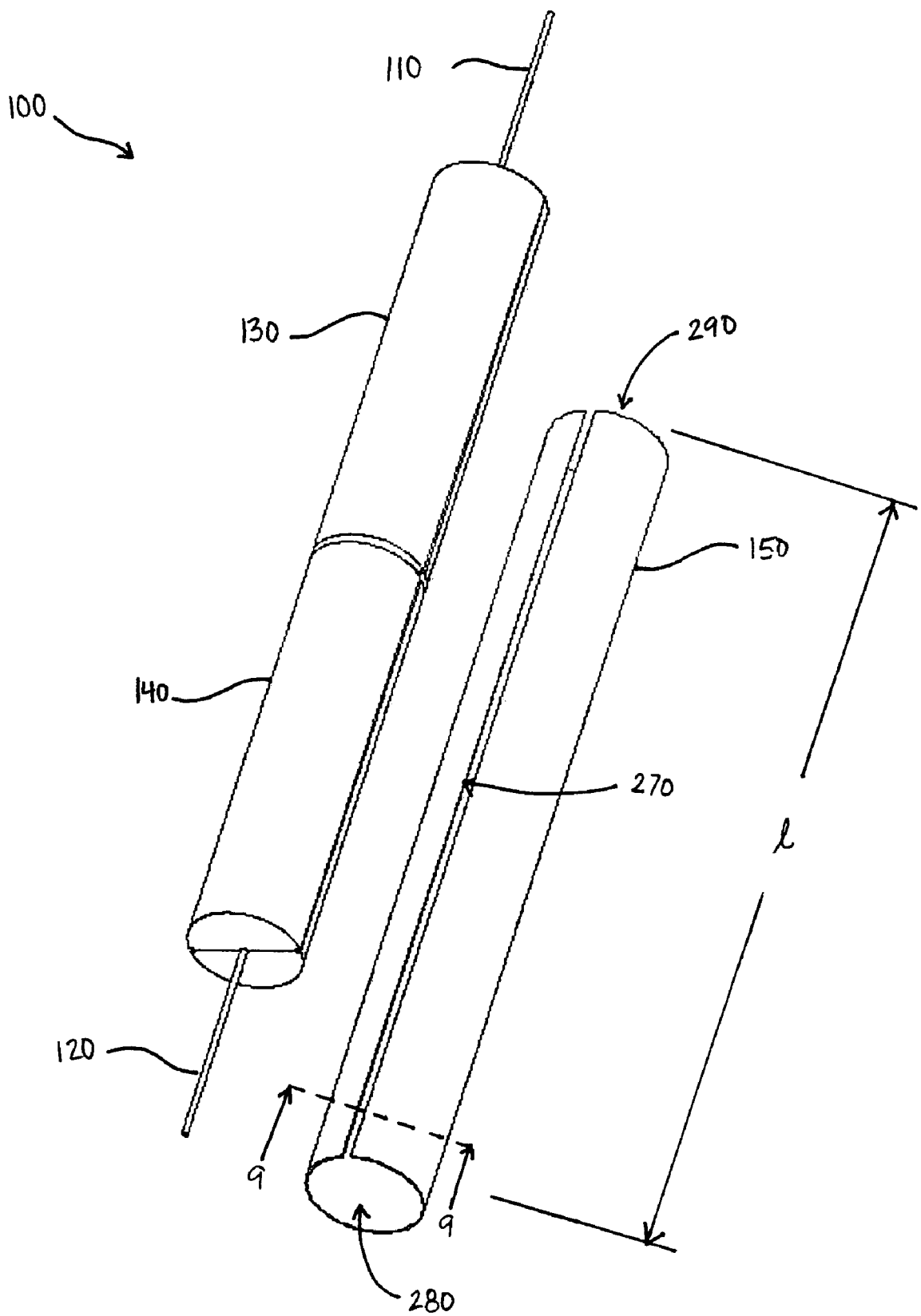
FIG. 3 is an exploded view of the optoelectronic assembly shown in FIG. 2.

FIG. 2 is a perspective view of an optoelectronic assembly 100 in accordance with one embodiment of the present invention. FIG. 3 is an exploded view of the optoelectronic assembly 100 shown in FIG. 2. The optoelectronic assembly 100 includes optical fibers 110 and 120, a pair of identical precision ferrules 130 and 140, and a precision split sleeve 150. The optical fibers 110 and 120 can be any type of optical fiber well known in the art, such as single mode or multi-mode fibers. Also, the optical fibers 110 and 120 can have any outside diameter, such as 0.125 mm, depending on the particular requirements.

Figure 4:
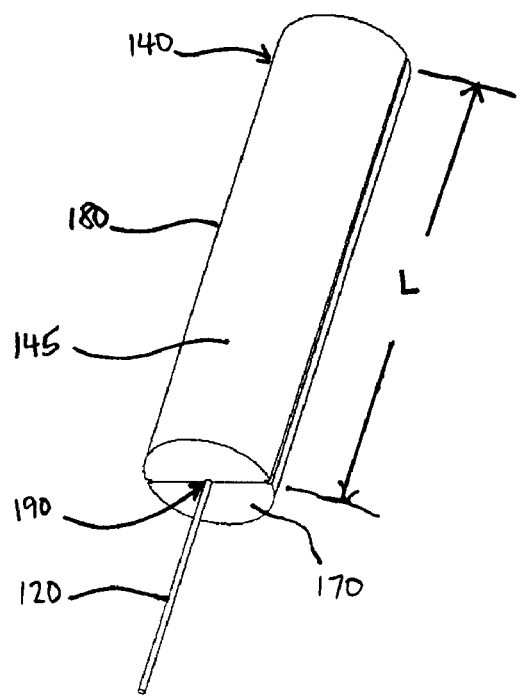
FIGS. 4 and 5 are rear and front perspective views of a ferrule supporting an optical fiber, such as the ferrule supporting the fiber shown in FIG. 3.
Figure 5:
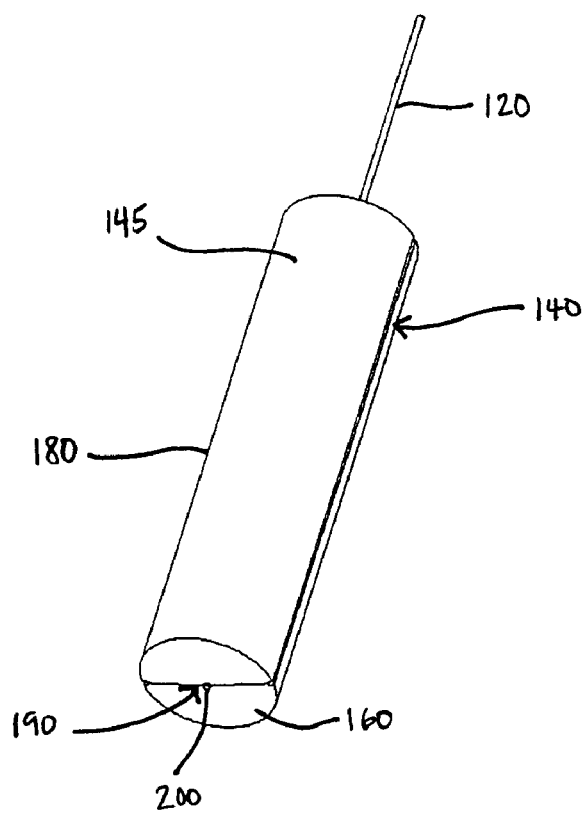

The ferrules 130 and 140 fixedly support ends of the optical fibers 110 and 120, respectively, for facilitating coupling of the optical fibers 110 and 120 together. FIGS. 4 and 5 are rear and front perspective views of a ferrule supporting an optical fiber, such as the ferrule 140 supporting the fiber 120 shown in FIG. 3. The ferrule 140 has a generally solid, uniform cylindrically shaped body 145 having a length L, front and rear face surfaces 160 and 170, and an arcuate/contact peripheral surface 180. The ferrule 140 also includes a shaft/bore 190 extending through and along the length L of the ferrule body 145. The shaft 190 is sized and shaped to snugly receive the outer diameter of the optical fiber 120. The optical fiber 120 is nested within the shaft 190 such that an end 200 of the optical fiber 120 is substantially co-planar and flushed with the front face surface 160 of the ferrule 140 (as shown in FIG. 5). The front face surface 160 is substantially planar. The plane of the front face surface 160 can be oriented at a fixed angle relative to the longitudinal axis of the shaft 190. This allows better fiber-to-fiber connection and reduces optical reflections back into the fiber respectively. However, one skilled in the art can recognize that the front face surface can alternatively be non-planar (not shown).

Figure 6:
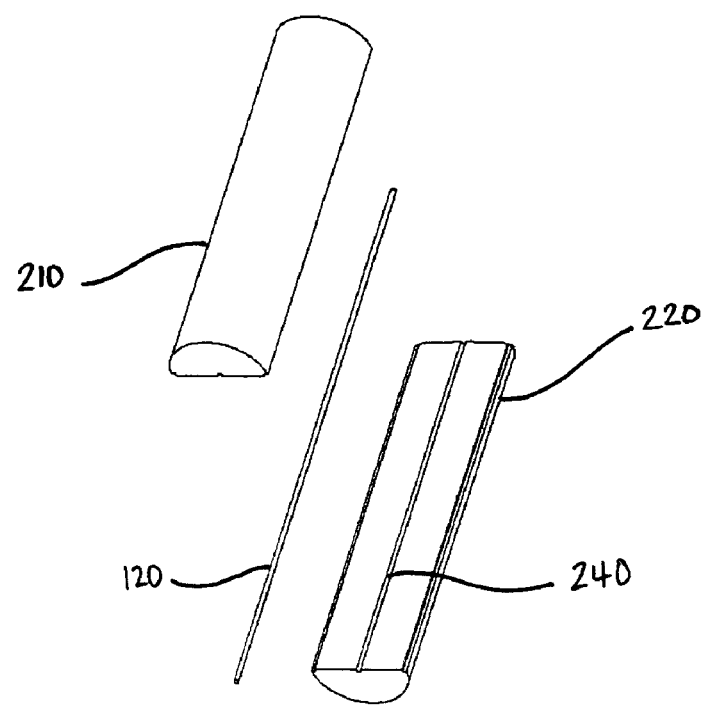
FIG. 6 is an exploded view of the ferrule and the fiber shown in FIGS. 4 and 5.
Figure 7:
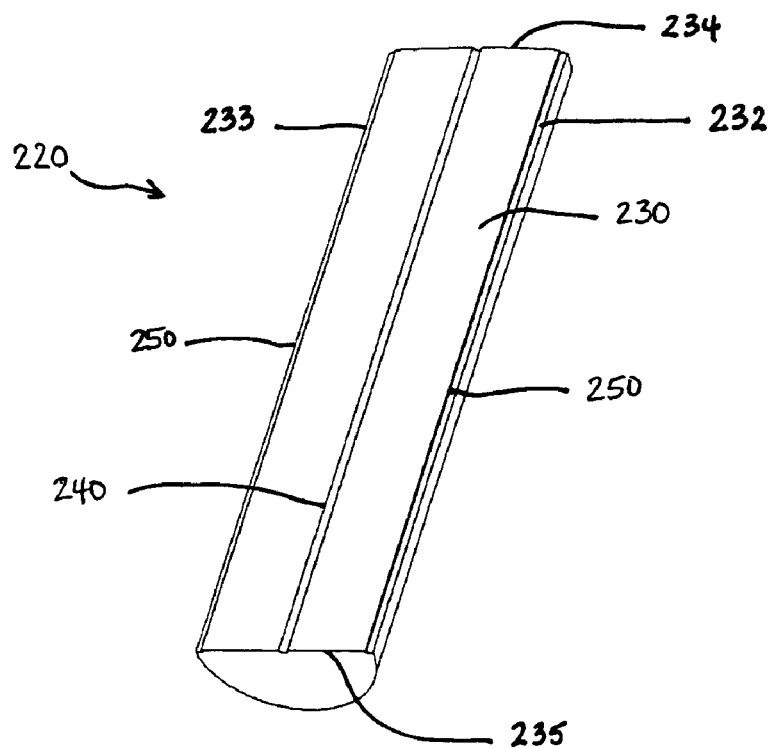
FIG. 7 is a perspective view of a half ferrule, such as the half ferrule shown in FIG. 6.

FIG. 6 is an exploded view of the ferrule 140 and the fiber 120 shown in FIGS. 4 and 5. The ferrule body 145 includes two identical half ferrules 210 and 220. FIG. 7 is a perspective view of a half ferrule, such as the half ferrule 220 shown in FIG. 6. The half ferrule 220 has a full semicircular end cross-section and a planar surface 230. The two half ferrules 210 and 220 are assembled together along their planar surfaces 230. On the planar surface 230 is defined a groove 240 extending along the length of the half ferrule 220 for nesting the end 200 of the optical fiber 120. The groove 240 has a uniform shape throughout its entire length. The groove 240 can be a semi-circular groove (as shown in FIG. 7), a V-groove (not shown), or any other groove configuration capable of nesting the outer diameter of the fiber. When the two half ferrules are attached together, the grooves 240 of the two half ferrules 210 and 220 define the shaft 190 of the ferrule 140. The groove can alternatively have a non-uniform shape along its length. For example, the groove can have a shape such that when the half ferrules are assembled together, the grooves define a shaft having a conical end. This allows a fiber to be more easily inserted into the shaft and affixed to the ferrule.

Figure 8:
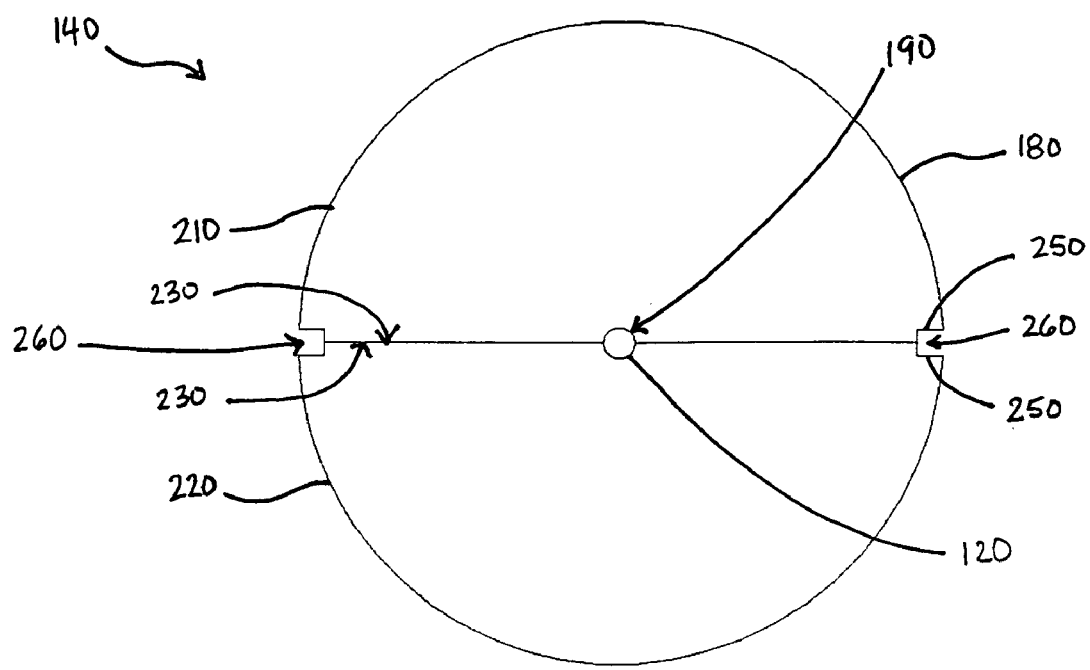
FIG. 8 is an end view of the ferrule shown in FIG. 5.

The half ferrule 220 includes notches 250 defined along edges of the planar surface 230 that facilitate assembling the two half ferrules 210 and 220 together. The half ferrule 220 can include notches 250 on both side edges 232 and 233 extending along the length of the planar surface 230 (as shown in FIG. 7), on either of the side edges 232 and 233 (not shown), or on either or both end side edges 234 and 235 (not shown). The notches 250 can extend substantially along the entire length of the half ferrule 220 (as shown in FIG. 7) or extend along only a portion of the length of the half ferrule (not shown). FIG. 8 is an end view of the ferrule 140 shown in FIG. 5. When the two half ferrules 210 and 220 are assembled together along their planar surfaces 230, the notches 250 of the half ferrules 210 and 220 define recesses 260 on the arcuate peripheral surface 180 of the ferrule 140. As discussed more fully below, the half ferrules 210 and 220 are attached together along the recesses 260. For example, the half ferrules 210 and 220 can be welded together along the recess 260. The recesses 260 are of a sufficient depth so that the welded material remains within the recesses 260 and does not rise above the arcuate peripheral surface 180, which can affect alignment of the fiber 120. Alternatively, an adhesive material can be used to attach the half ferrules 210 and 220 together.

In the embodiment shown in FIGS. 4 and 5, the ferrule 140 dimensions can be 2.5 mm or 1.25 mm in end cross-section diameter and 10 mm in length. It is understood, however, that the dimensions are by way of example only and that other dimensions are also possible.

Figure 9A:
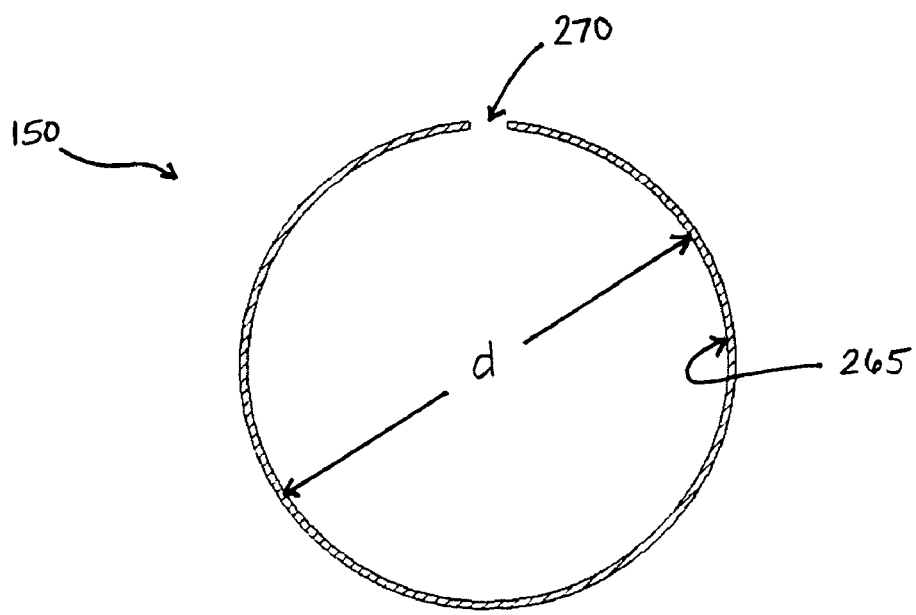
FIG. 9a is a sectional view of the split sleeve taken along line 9-9 shown in FIG. 3.

Referring back to FIG. 3, the optoelectronic assembly 100 includes the split sleeve 150. FIG. 9a is a sectional view of the split sleeve 150 taken along line 9-9 shown in FIG. 3. The split sleeve 150 has a substantially hollow cylindrical shape having a length 1, an inner diameter d that is slightly less than the outer diameter of the ferrules 120 and 140, and an inner surface 265. For example, a ferrule having an outer diameter of about 2.499±0.0005 mm, the split sleeve 150 can have an inner diameter d of about 2.493±0.004−0.000 mm. The split sleeve 150 includes a split 270 extending along its entire length 1. The split 270 allows the inner diameter d of the split sleeve 150 to expand to accommodate the larger diameter of the ferrules 210 and 220.

The split sleeve 150 facilitates alignment of the ends 200 of the optical fiber 110 and 120 relative to each other. The ferrules 130 and 140, supporting the fibers 110 and 120 respectively, are inserted through opposing ends 280 and 290 of the split sleeve 150. The inner diameter d of the split sleeve 150 slightly expands via the split 270 to accommodate the larger outer diameter of the ferrules 130 and 140. When the ferrules 130 and 140 are inserted within the split sleeve 150, the split sleeve 150 clamps on the arcuate peripheral surface 180 of the ferrules 130 and 140. As the ferrules 130 and 140 are moved towards each other, the inner surface 265 of the split sleeve 150 guides the ferrules 130 and 140 together until the ends of the fibers 110 and 120 contact each other. Once the ferrules 130 and 140 are aligned with each other within the split sleeve 150, the ends 200 of the fibers 110 and 120 are also precisely abutting each other, and therefore coupling the fibers 110 and 120 together.

The configuration of the ferrules 130 and 140 and the split sleeve 150 allow these components to be produced and assembled by a stamping process that is capable of producing parts having tolerances below 1000 nm, such as the stamping process described in our pending U.S. patent application Ser. No. [Not Yet Available].

Figure 10:
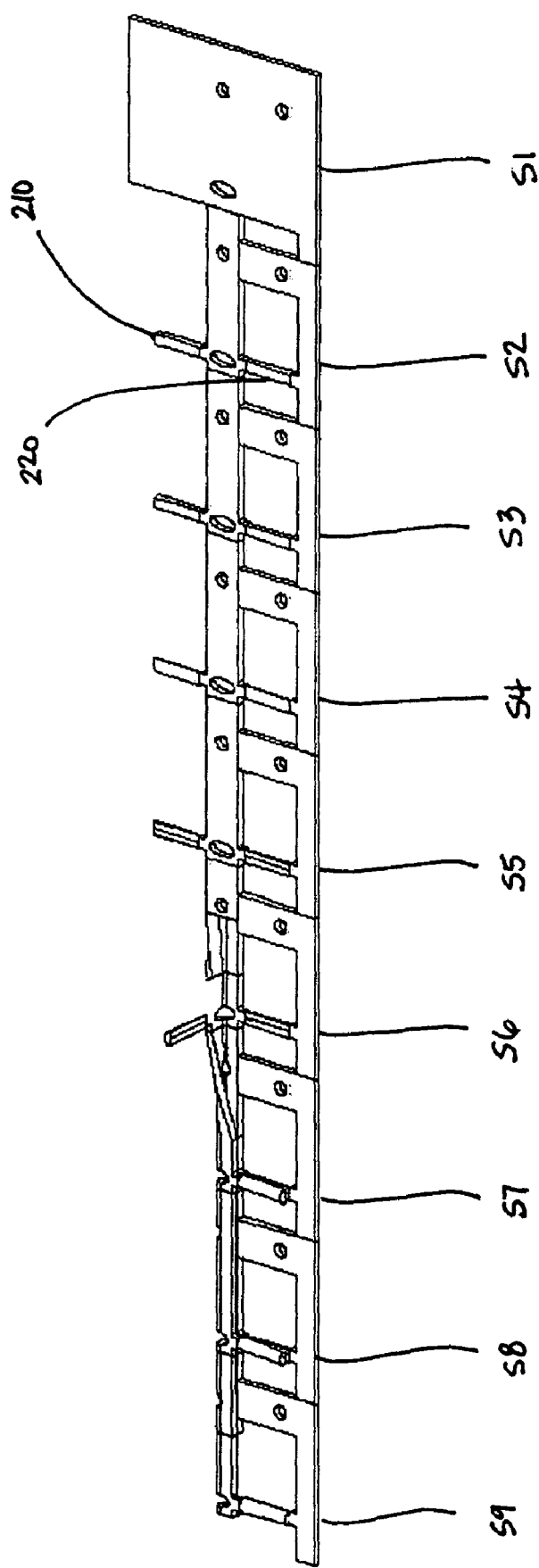
FIG. 10 is a "two-up configuration strip layout" design to forge the ferrule shown in FIGS. 4 and 5.

The ferrules 130 and 140 can be produced by various processes, such as a forging process. FIG. 10 is a "two-up configuration strip layout" design to forge the ferrule 140 shown in FIGS. 4 and 5. The progression includes nine die stations S1-S9, for example. As shown by the strip layout design, the two half ferrules 210 and 220 can be produced from a single strip of stock material at a time in a "two-up" configuration, such as at stations S1-S4. The front and rear face surfaces 160 and 170 and the arcuate peripheral surface 180 are forged at these stations. At another station, such as station S5, the grooves 240 are forged on the planar surfaces 230 of the half ferrules 210 and 220. The half ferrules 210 and 220 are also provided with notches 250 for assembling the two half ferrules 210 and 220 together. The two half ferrules 210 and 220 are assembled together and aligned with an optical fiber at stations S6-S8 in preparation for laser welding at station S9. The half ferrules 210 and 220 can also be welded without an optical fiber. In this case, the fiber is inserted at a latter time. A Starweld20 laser welder manufactured by Rofin, Inc. is an example of a laser welder in which a laser pulse is delivered to the part to be welded. In addition to performing the welding function, the laser system can be employed to strip the coating from the fiber as well as properly preparing the fiber end face. When the two half ferrules 210 and 220 have been welded together at the recesses 260, the ferrule 140 securely and precisely positions the end of the optical fiber.

Figure 9B:
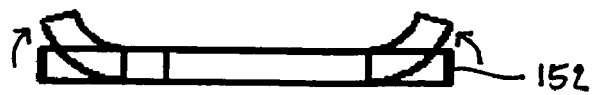
FIGS. 9b-e are sectional views of the split sleeve shown in FIG. 3 showing the split sleeve being formed from a work piece to the final split sleeve configuration.
Figure 9C:
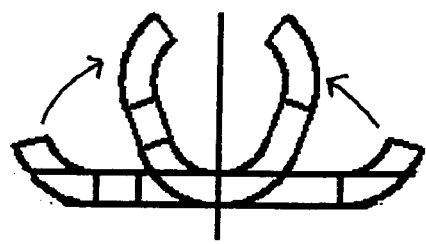
Figure 9D:
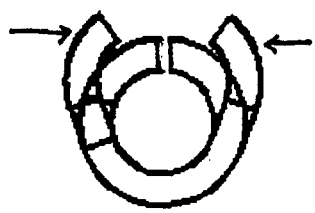
Figure 9E:

The split sleeve 150 can be fabricated by a forming process. The split sleeve 150 can be formed in a progression including four cutting stations and five to six forming stations. FIGS. 9b-e are sectional views of the split sleeve 150 showing the split sleeve being formed from a work piece 152 to the final split sleeve configuration. As shown in FIG. 9b, forming the split sleeve begins with a single, flat work piece 152. The flat work piece 152 is then progressively formed in the forming stations (as shown in FIGS. 9b-9d) into the final split sleeve configuration shown in FIG. 9e.

The ferrules 130 and 140 and the split sleeve 150 are designed to be backward compatible with conventional ferrules existing in the field today. As stated above, conventional ferrules are cylindrical in shape having circular end cross-sections. The ferrules 130 and 140 have circular end cross-sections that facilitate coupling the optical fibers supported by the ferrules 130 and 140 with the fibers supported by a conventional ferrule. The split sleeve 150 is adapted to receive ferrules having a cylindrical shape, such as a conventional ferrule. It is understood that the ferrules 130 ad 140 can be designed without this backward compatible feature. As such, the ferrules 130 and 140 and the ferrules 150 can have other end cross-sections, such as square or rectangular (not shown).

Partial Semi-circle Half Ferrule

Figure 11:
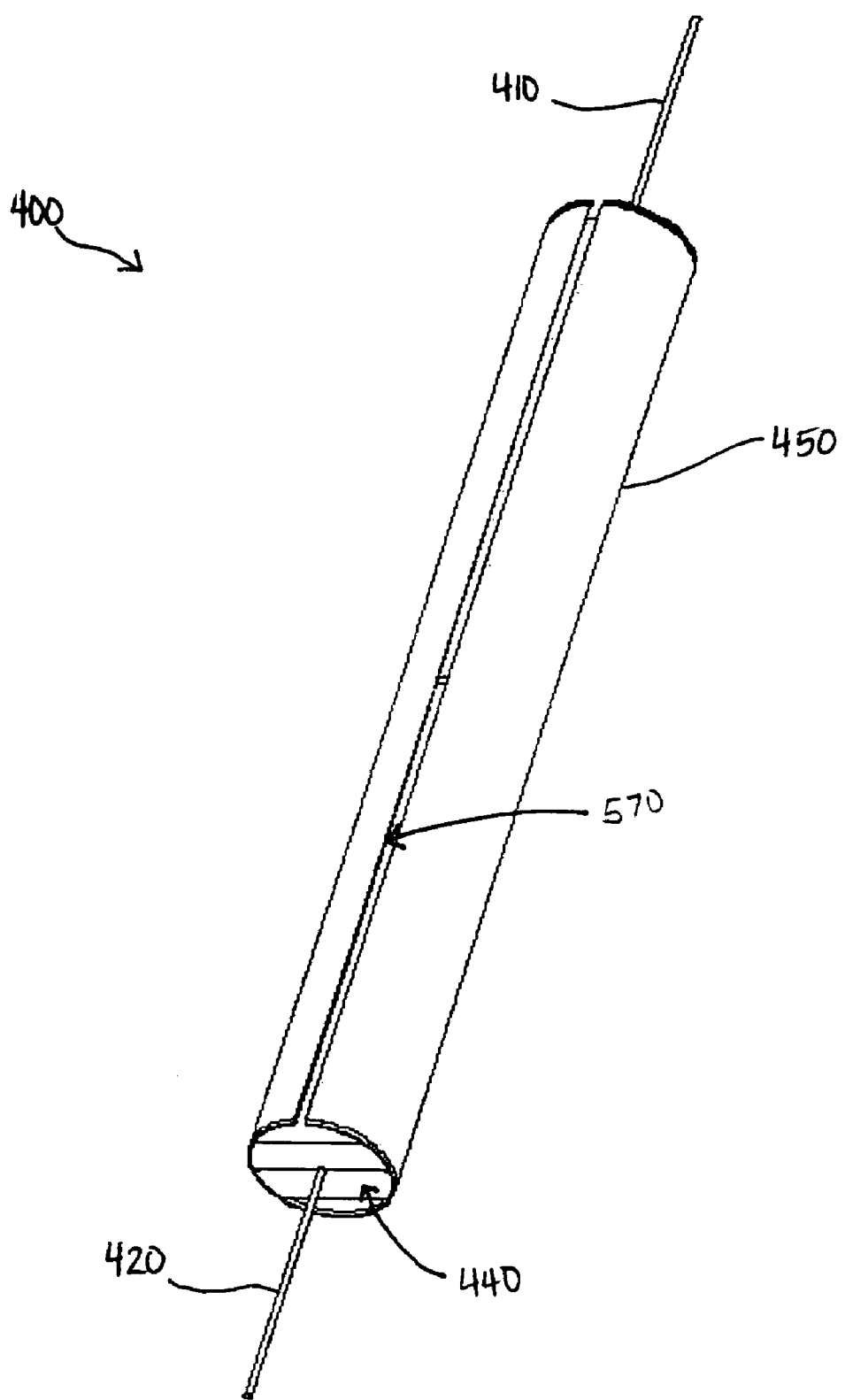
FIG. 11 is a perspective view of an optoelectronic assembly in accordance with another embodiment of the present invention.
Figure 12:
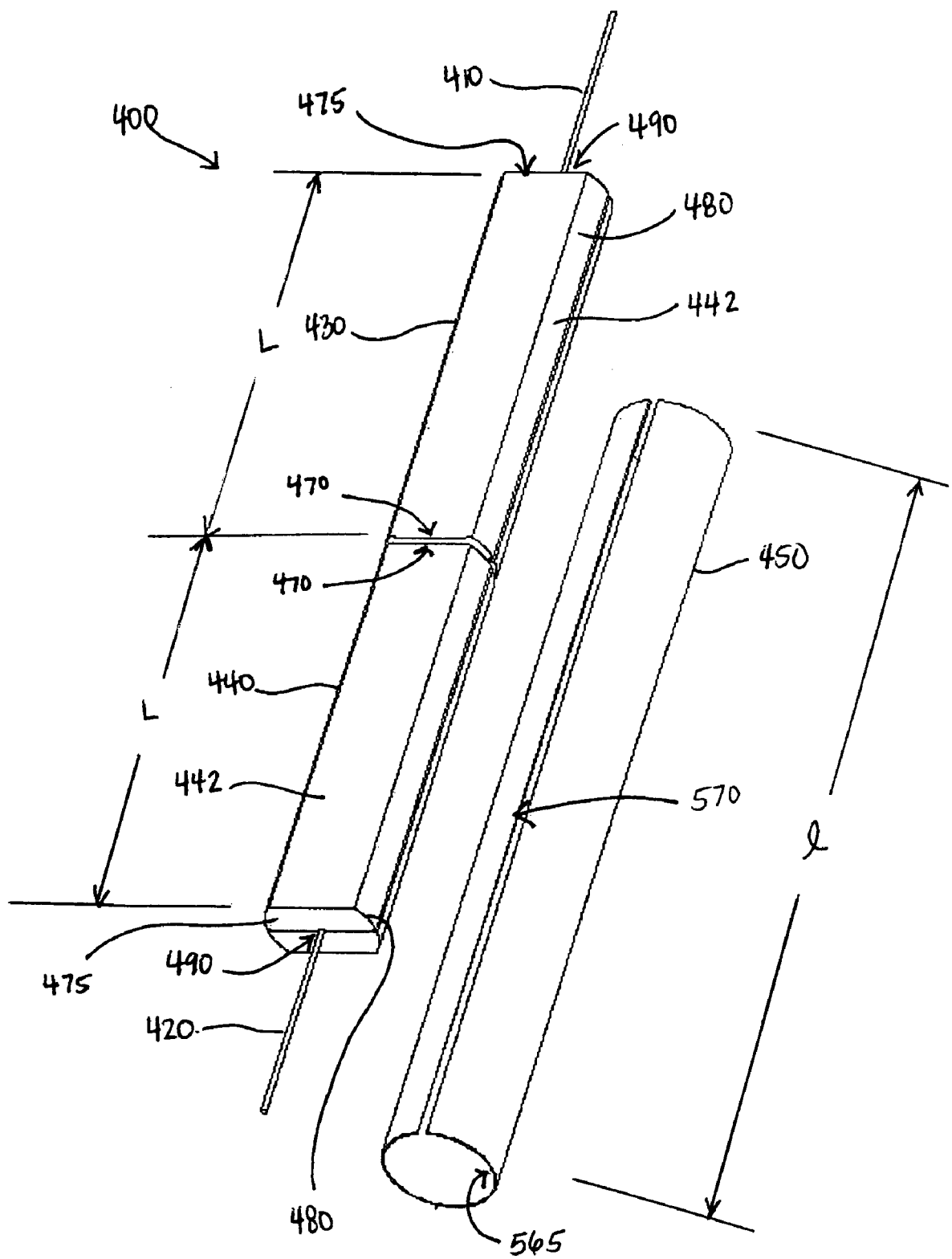
FIG. 12 is an exploded view of the optoelectronic assembly shown in FIG. 11.

In the embodiment shown in FIG. 7, the half ferrule 220 has a full semi-circular end cross-section. The half ferrules can be designed to have alternative shapes, such as a partial semi-circular end cross-section. FIG. 11 is a perspective view of an optoelectronic assembly 400 in accordance with another embodiment of the present invention. FIG. 12 is an exploded view of the optoelectronic assembly 400 shown in FIG. 11. The optoelectronic assembly 400 includes optical fibers 410 and 420, a pair of ferrules 430 and 440, and a split sleeve 450.

Figure 13:
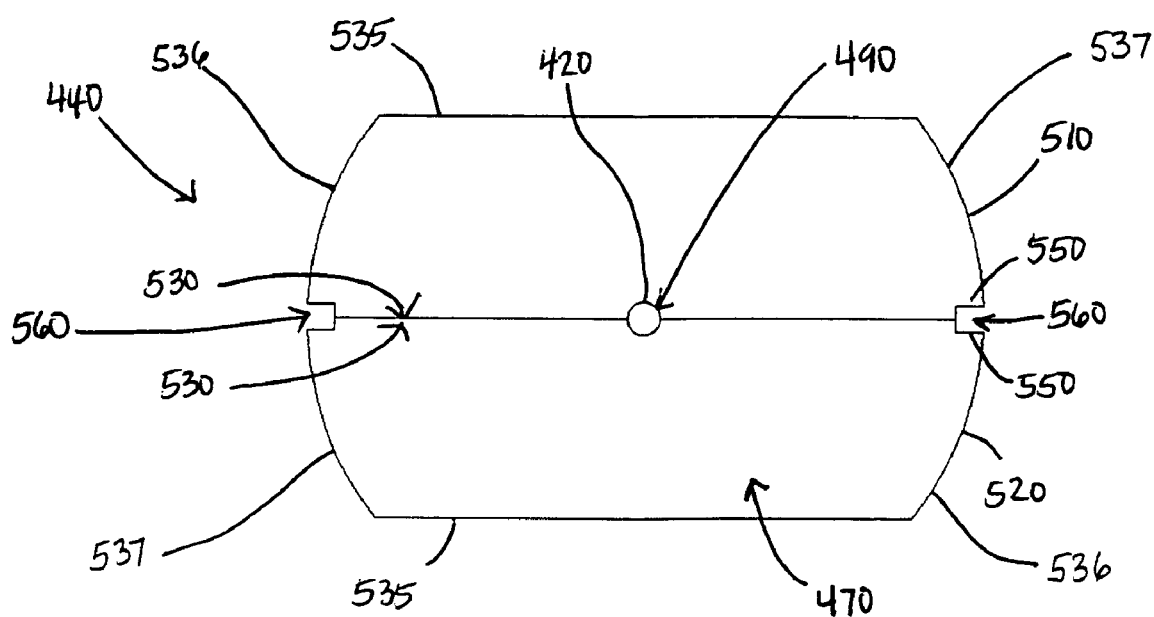
FIG. 13 is an end view of the ferrule shown in FIG. 12.

Each of the ferrules 430 and 440 has a generally uniform, cylindrically shaped body 442 with a length L, front and rear face surfaces 470 and 475, arcuate/contact peripheral surfaces 480, and a shaft/bore 490 extending through length L of the body 442. FIG. 13 is an end view showing the front face surface 470 of the ferrule 440 shown in FIG. 12. The shaft 490 is sized and shaped to snugly receive the outer diameter of the optical fiber 420, for example.

Figure 14:
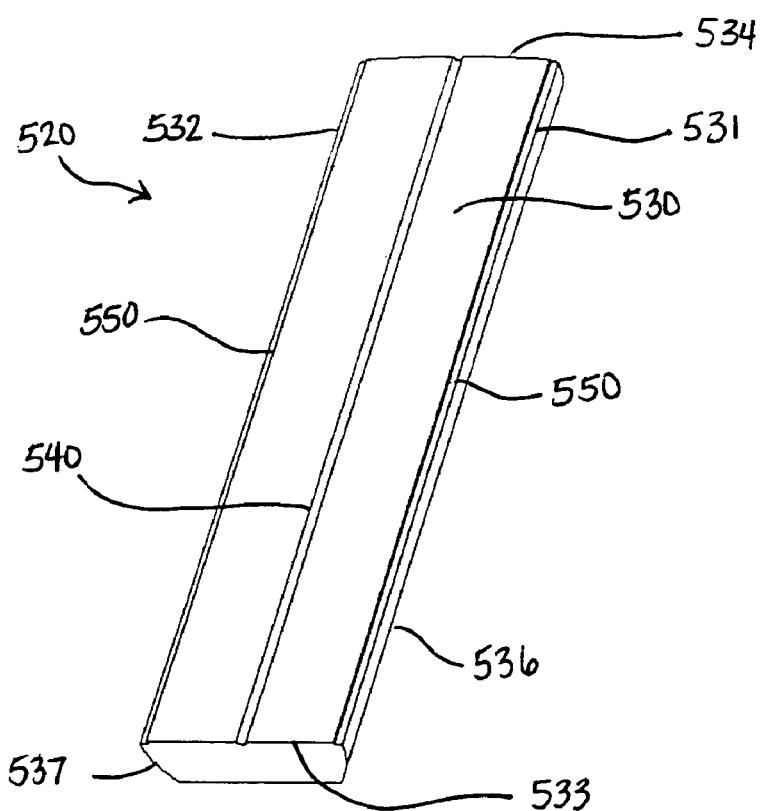
FIG. 14 is a perspective view of a half ferrule, such as the half ferrule shown in FIG. 13.

The ferrule body 442 includes two identical half ferrules 510 and 520 attached together. FIG. 14 is a perspective view of a half ferrule, such as the half ferrule 520 shown in FIG. 13. The half ferrule 520 has a partial semi-circular end cross-section, wherein the half ferrule 520 has planar surfaces 530 and 535 and arcuate peripheral surfaces 536 and 537. The two half ferrules 510 and 520 are assembled together along their planar surfaces 530. On the planar surface 530 is defined a groove 540 extending along the length of the half ferrule 520 for nesting the optical fiber 420. The groove 540 has a uniform shape throughout its entire length. When the two half ferrules 510 and 520 are attached together, the grooves 540 of the two half ferrules 510 and 520 define the shaft 490 of the ferrule 440. The groove can alternatively have a non-uniform shape along its length. For example, the groove can have a shape such that when the half ferrules are assembled together, the grooves define a shaft having a conical end. This allows a fiber to be more easily inserted into the shaft and affixed to the ferrule.

The half ferrule 520 includes notches 550 defined along edges of the planar surface 530 that facilitate assembling the two half ferrules 510 and 520 together. The half ferrule 520 can include notches 550 on both side edges 531 and 532 extending along the length of the planar surface 530 (as shown in FIG. 14), on either of the side edges 531 and 532 of the planar surface (not shown), or on either or both end side edges 533 and 534 (not shown). The notches 550 can extend substantially along the entire length of the half ferrule 520 (as shown in FIG. 14) or extend along only a portion of the length of the half ferrule (not shown). When the two half ferrules 510 and 520 are assembled together along their planar surfaces 530, the notches 550 of the half ferrules 510 and 520 define recesses 560 on the arcuate peripheral surfaces 480 of the ferrule 440.

In the embodiment shown in FIG. 12, the dimensions of the ferrules 430 and 440 can be 2.5 mm or 1.25 mm in end cross-section diameter, and 10 mm in length. It is understood, however, that the dimensions are by way of example only and that other dimensions are also possible.

The optoelectronic assembly 400 includes the split sleeve 450 having an inner diameter slightly less than the outer diameter of the ferrules 430 and 440, an inner surface 565, and a split 570 for allowing the inner diameter of the split sleeve 450 to expand to accommodate the larger diameter of the ferrules 430 and 440.

The split sleeve 450 facilitates alignment of the ends of the optical fiber 410 and 420 relative to each other. When the ferrules 430 and 440 are inserted within the split sleeve 450, the split sleeve 450 clamps on the arcuate peripheral surface 480 of the ferrules 430 and 440. As shown in FIG. 11, the ferrules 430 and 440 do not completely fill in the inner diameter of the split sleeve 450. However, the arcuate peripheral surfaces 480 of the ferrules 430 and 440 maintain contact with the inner surface 565 of the split sleeve 450 for guiding the optical fibers 410 and 420 together. As compared to a ferrule having a cylindrical shape, the design of the partial semi-circular half ferrules 510 and 520 allows for less contact of the ferrules 430 and 440 to the inner surface 565 of the split sleeve 450. Therefore, effects of any imperfections on the inner surface 565 of the split sleeve 450 on guiding the ferrules 430 and 440 are minimized.

Figure 15:
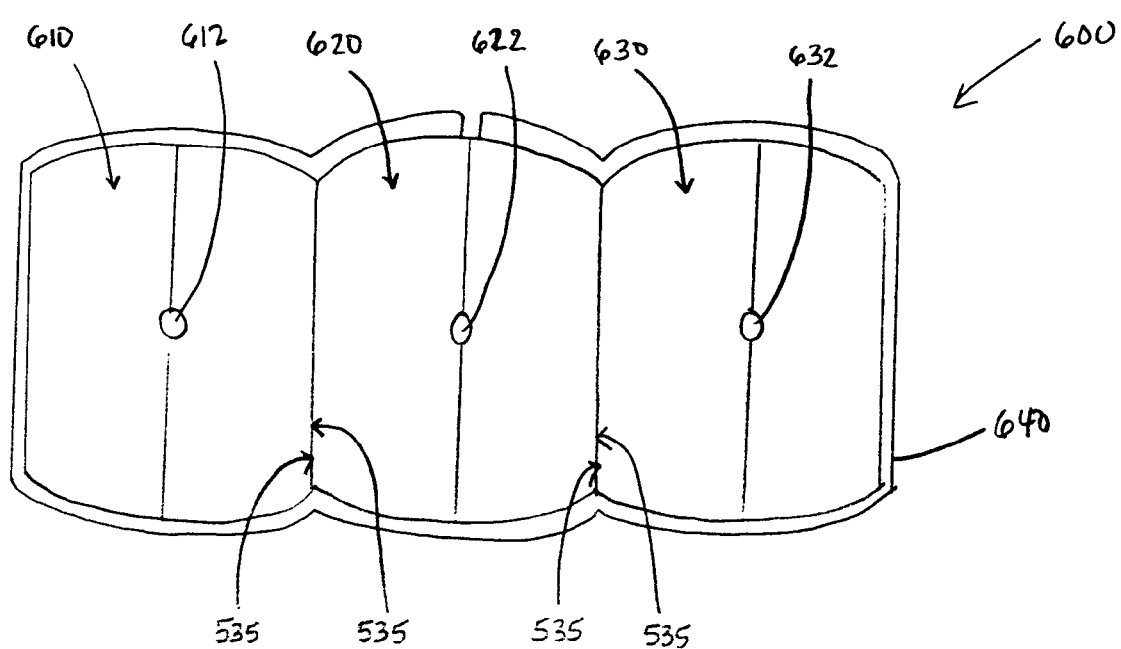
FIG. 15 is an end view of a packed ferrule array.

As compared to conventional ferrules that have a solid cylindrical shape, the partial semi-circular shape of the half ferrules 510 and 520 require less material to produce each part. As such, producing the ferrules 430 and 440 can result in lower material costs. Additionally, the partial semi-circular design, when properly configured and matched with a split sleeve of proper design, offers advantage in the packing density of a group of fibers tightly packed in a one or two-dimensional array. FIG. 15 is an end view of a packed ferrule array 600. The ferrule array 600 includes three ferrules 610, 620 and 630, for example. The ferrules 610, 620 and 630 support optical fibers 612, 622 and 632, respectively. Planar surfaces 535 allow the ferrules 610, 620 and 630, and therefore the fibers 612, 622 and 632, to be tightly packed together. A split sleeve 640 is sized and shaped to receive the tightly packed ferrules 610, 620 and 630.

Figure 16:
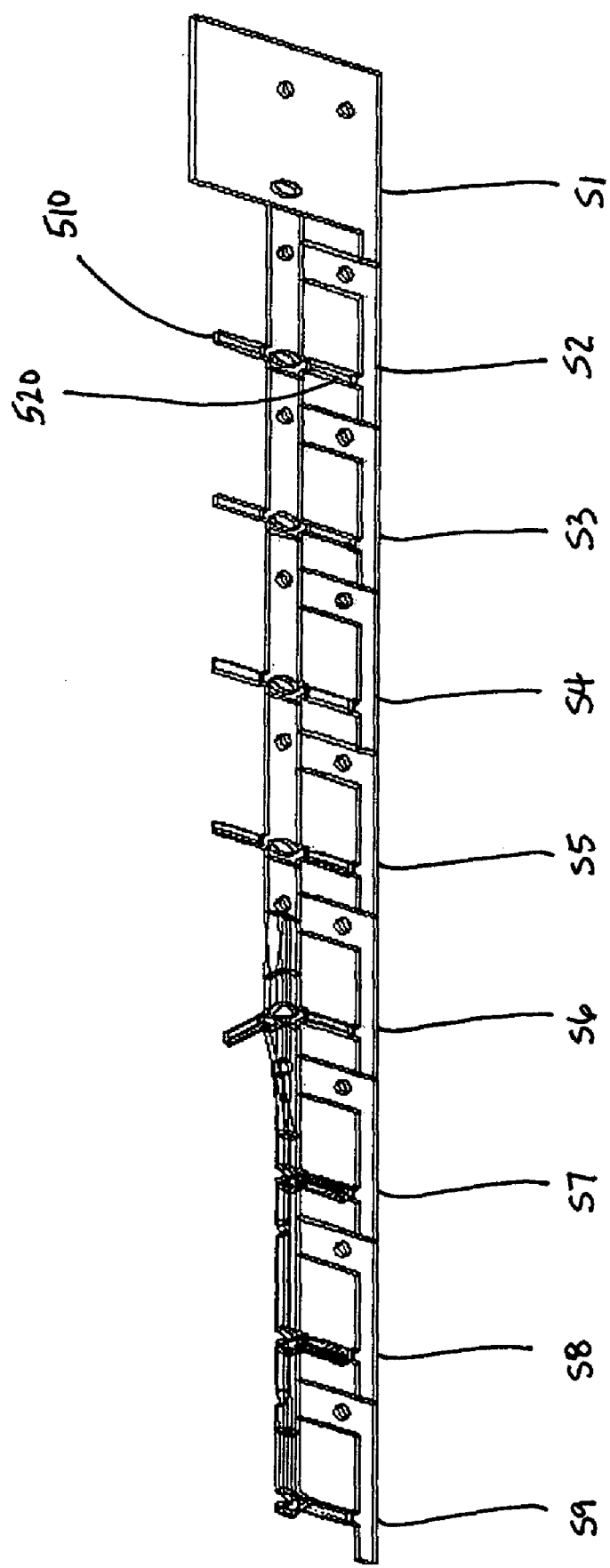
FIG. 16 is a "two-up configuration strip layout" design to forge the ferrule shown in FIG. 12.

Furthermore, the configuration of the ferrules 430 and 440 allow these components to be produced by a forging process. FIG. 16 is a "two-up configuration strip layout" design to forge the ferrule 440 shown in FIG. 12. The progression includes nine die stations S1-S9, for example. As shown by the strip layout design, the two half ferrules 510 and 520 can be produced from a single strip of stock material at a time in a "two-up" configuration, such as at stations S1-S4. The front and rear face surfaces 470 and 475 and the arcuate peripheral surface 480 are forged at these stations. At another station, such as station S5, the grooves 540 are forged on the planar surfaces 530 of the half ferrules 510 and 520. The half ferrules 510 and 520 are also provided with notches 550 for assembling the two half ferrules 510 and 520 together. The two half ferrules 510 and 520 are assembled together and aligned with an optical fiber at stations S6-S8 in preparation for laser welding at station S9. The half ferrules 510 and 520 can also be welded without the optical fiber. In this case, the fiber is inserted at a latter time. When the two half ferrules 510 and 520 have been welded together at the recesses 560, the ferrule 440 securely and precisely positions the end of the optical fiber.

The ferrules 430 and 440 and the split sleeve 450 are designed to be backward compatible with conventional ferrules existing in the field today. As stated above, conventional ferrules are cylindrical in shape having circular end cross-sections. The ferrules 430 and 440 have partial circular end cross-sections that facilitate coupling the optical fibers supported by the ferrules 430 and 440 with the fibers supported by a conventional ferrule. The split sleeve 450 is adapted to receive ferrules having a cylindrical shape, such as a conventional ferrule. It is understood that the ferrules 430 ad 440 can be designed without this backward compatible feature. As such, the ferrules 430 and 440 and the ferrules 450 can have other end cross-sections, such as square or rectangular (not shown).

Multi-fiber Ferrule

Figure 17:
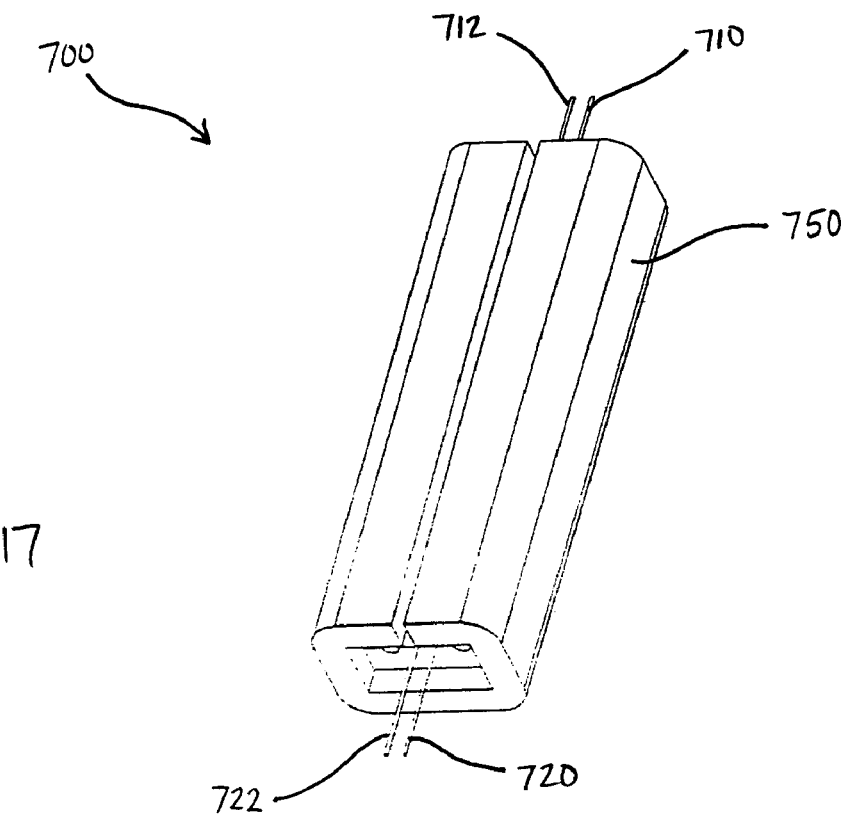
FIG. 17 is a perspective view of a multi-fiber optoelectronic assembly in accordance with another embodiment of the present invention.
Figure 18:
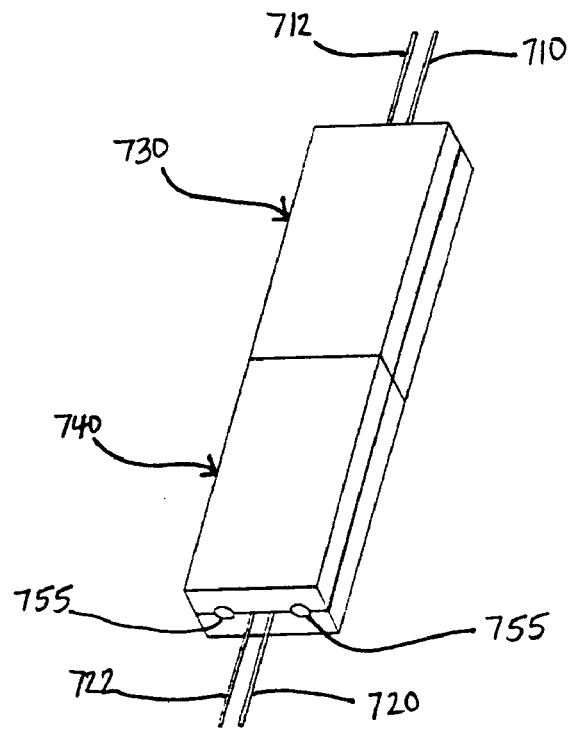
FIG. 18 is a perspective view of the optoelectronic assembly without with the split sleeve.

The embodiments of the ferrules shown in FIGS. 4 and 12 are designed for aligning single fibers. The ferrules can be designed to support and align multiple fibers. FIG. 17 is a perspective view of a multi-fiber optoelectronic assembly 700 in accordance with another embodiment of the present invention. For example, the optoelectronic assembly 700 supports and aligns two fibers 710 and 712 with respect to fibers 720 and 722. However, the optoelectronic assembly 700 can be configured to support any number of optical fibers. The optoelectronic assembly 700 includes a split sleeve 750. FIG. 18 is a perspective view of the optoelectronic assembly 700 without with the split sleeve 750. The optoelectronic assembly 700 includes a pair of ferrules 730 and 740. The ferrules 730 and 740 fixedly support ends of the optical fibers 710, 712, 720 and 722, respectively, for facilitating coupling of the optical fibers together.

Figure 19:
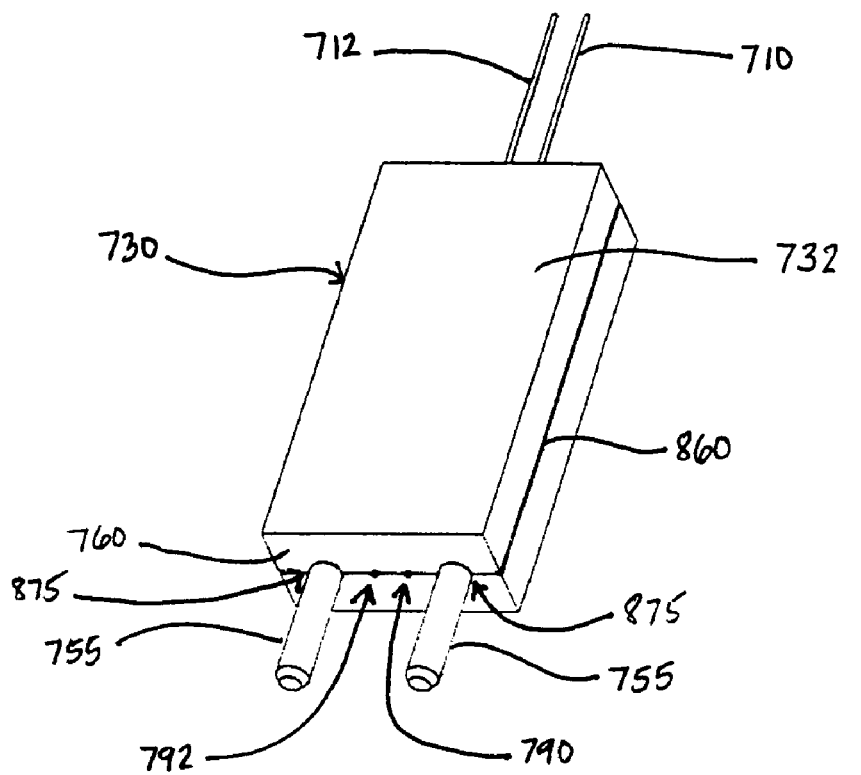
FIG. 19 is a perspective view of one of the pair of ferrules shown in FIG. 18.

FIG. 19 is a perspective view of one of the pair of ferrules, such as the ferrule 730. The ferrule 730 is capable of supporting two fibers 710 and 712. The ferrule 730 includes a generally uniform, cylindrically-shaped body 732 having a front face surface 760 and two shafts 790 and 792 sized and shaped to snugly receive the outer diameter of the optical fibers 710 and 712.

Figure 20:
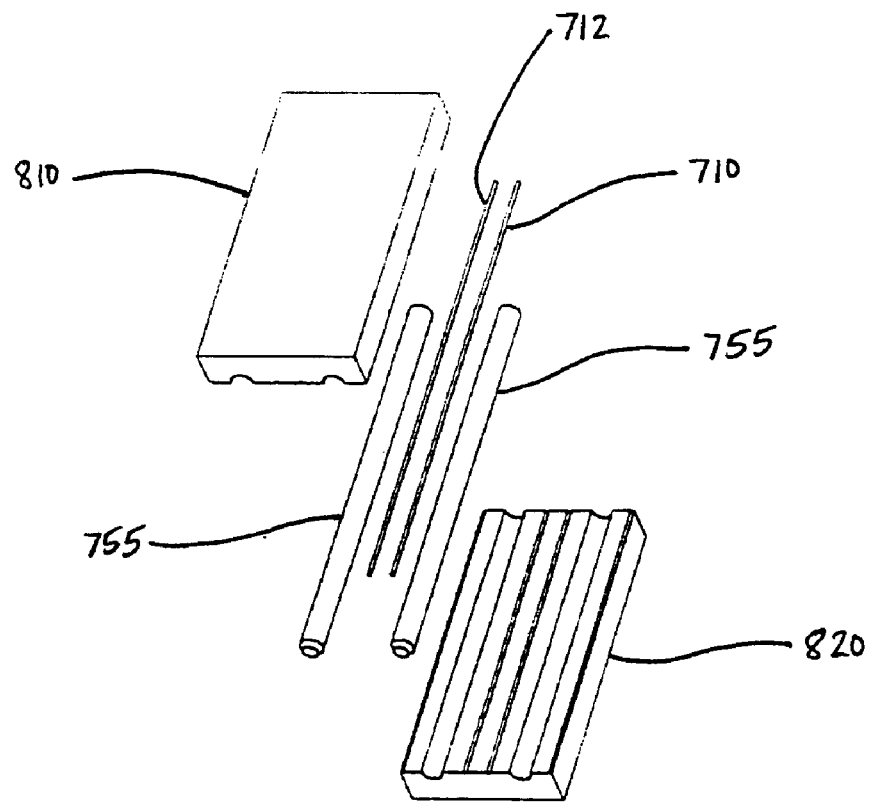
FIG. 20 is an exploded view of the ferrule and the fibers shown in FIG. 19.
Figure 21:
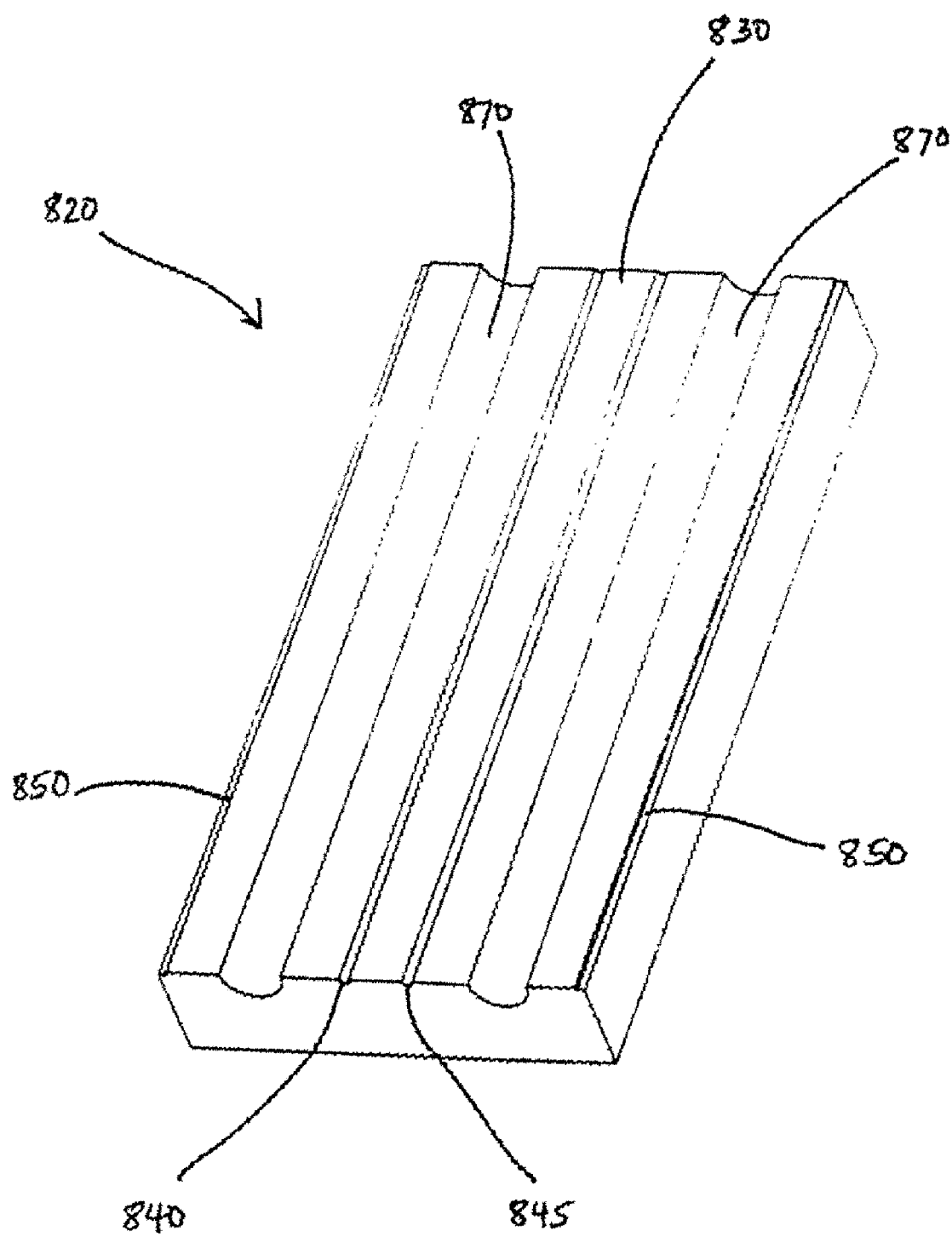
FIG. 21 is a perspective view of a half ferrule, such as the half ferrule shown in FIG. 20.

FIG. 20 is an exploded view of the ferrule 730 and the fibers 710 and 712 shown in FIG. 19. The ferrule body 732 includes two identical half ferrules 810 and 820. FIG. 21 is a perspective view of a half ferrule, such as the half ferrule 820 shown in FIG. 20. The half ferrule 820 has a planar surface 830. Grooves 840 and 845 are defined on the planar surface 830 for nesting the ends of the optical fibers 710 and 712. The grooves 840 and 845 have a uniform shape throughout their entire length. When the two half ferrules 810 and 820 are attached together, the grooves 840 and 845 of the two half ferrules 810 and 820 define the shafts 790 and 792 of the ferrule 730. The grooves can alternatively have a non-uniform shape along their lengths. For example, the grooves can have a shape such that when the half ferrules are assembled together, the grooves define shafts having a conical end. This allows a fiber to be more easily inserted into the shaft and affixed to the ferrule.

The half ferrule 820 includes notches 850 defined along edges of the planar surface 830 that facilitate assembling the two half ferrules 810 and 820 together. When the two half ferrules 810 and 820 are assembled together along their planar surfaces 830, the notches 850 of the half ferrules 810 and 820 define recesses 860 (shown in FIG. 19) on the surfaces of the ferrule 730. As discussed more fully below, the half ferrules 810 and 820 are attached together along the recesses 860. For example, the half ferrules 810 and 820 can be welded together along the recess 860. The recesses 860 are of a sufficient depth so that the welded material remains within the recesses 860 and does not rise above the surfaces of the ferrule 730.

The optoelectronic assembly 700 can include guide pins 755 for aligning the ferrules 730 and 740, and therefore the optical fibers, with respect to each other. The half ferrule 820 includes grooves 870 defined on the planar surface 830 for nesting the guide pins 755. When the half ferrules 810 and 820 are attached together, the groves 870 define pin shafts or holes 875. The pin shafts 875 are sized to snugly receive the guide pins 755. The guide pins 755 are fitted within the pin shafts 875 of the ferrule 730 such that the guide pins 755 extend from the front face surface 760 of the ferrule 730. The portions of the guide pins 755 extending from the front face 760 of the ferrule 730 is fitted into the pin shafts 875 of the ferrule 740. The guide pins 755 guide and align the ferrule 730 with respect to the ferrule 740, and therefore guiding and aligning the fibers 710 and 712 to the fibers 720 and 722.

The pin shafts 875 and the guide pins 755 provide the ferrules 730 and 740 mating compatibility with conventional multi-fiber ferrules existing in the field. One skilled in the art will recognize that the ferrules 730 and 740 can be configured without the pin shafts 875 and the guide pins 755.

Figure 22:
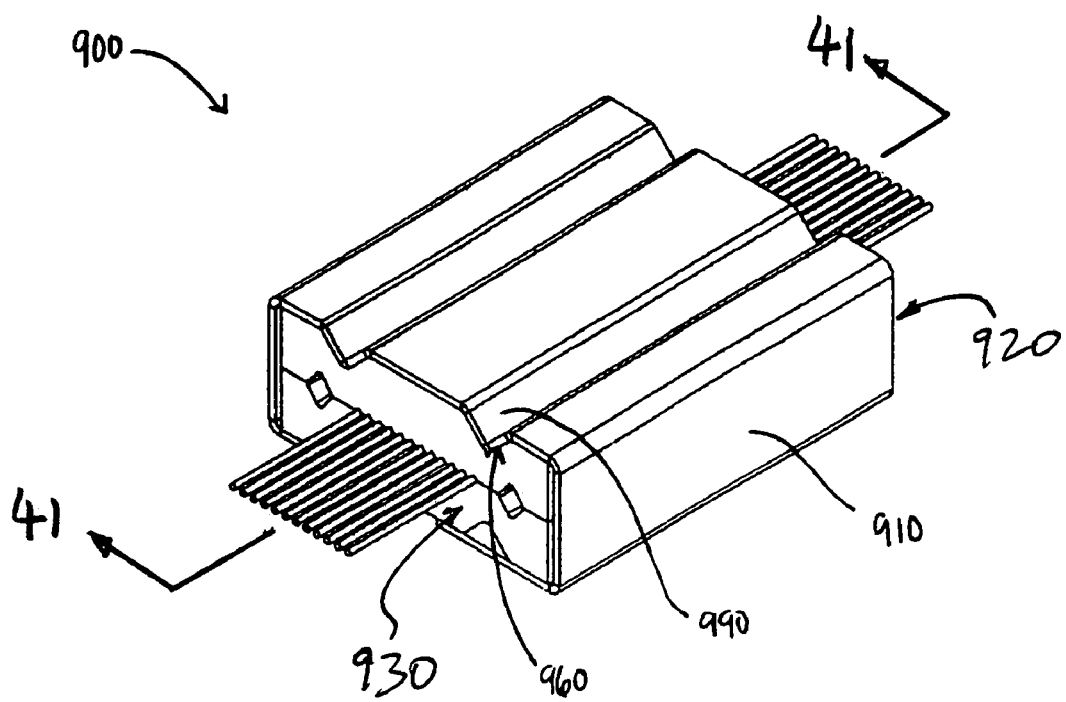
FIG. 22 is a perspective view of an optoelectronic assembly in accordance with another embodiment of the present invention.
Figure 23:
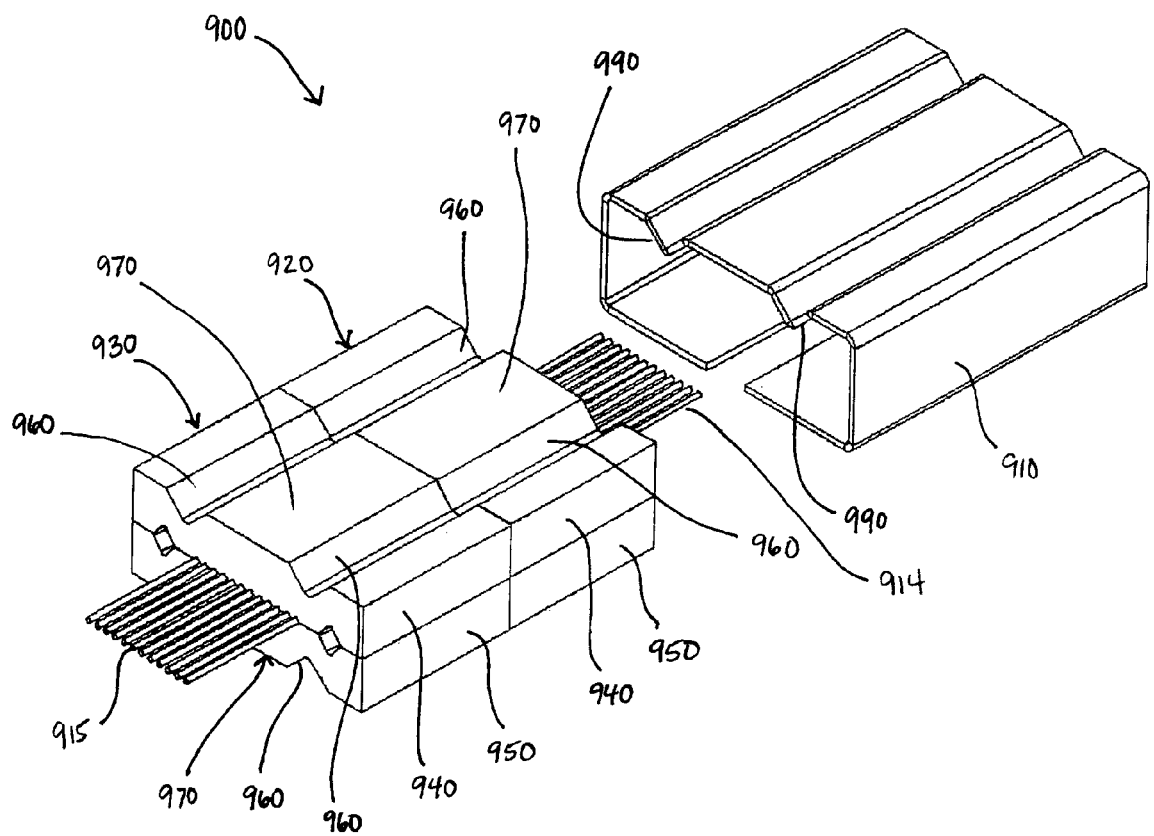
FIG. 23 is an exploded view of the optoelectronic assembly shown in FIG. 22.

Alternatively, the optoelectronic assembly 700 can include the split sleeve 750 for facilitating alignment of the ends of the optical fibers 710 and 712 to the ends of the fibers 720 and 722. In yet another alternative embodiment, the ferrules can include alignment grooves for facilitating alignment of the optical fibers. FIG. 22 is a perspective view of an optoelectronic assembly 900 in accordance with another embodiment of the present invention. FIG. 23 is an exploded view of the optoelectronic assembly 900 shown in FIG. 22. The optoelectronic assembly 900 includes a split sleeve 910 and a pair of multi-fiber ferrules 920 and 930 supporting a plurality of optical fiber arrays 914 and 915. The ferrules 920 and 930 include a pair of identical half ferrules 940 and 950 attached together. Alignment grooves 960 are defined on an outer surface 970 of the half ferrules 940 and 950. The alignment grooves 960 can be V-grooves, or other shaped grooves. The grooves 960 can be formed by a forging process, for example. The split sleeve 910 includes complementary protrusions 990 that are sized and shaped to be received in the grooves 960 of the ferrules 920 and 930. For ferrules 920 and 930 having V-grooves, the protrusions 990 are V-shaped to match the V-shape of the grooves 960. When the ferrules 920 and 930 are inserted into the split sleeve 910, the protrusions 990 nest within the grooves 960. The protrusions 990 guide the pair of ferrules 920 and 930, and therefore the optical fiber arrays 914 and 915, together. The alignment grooves 960 of the ferrules 920 and 930 and the matching protrusions 990 of the split sleeve 910 eliminate the need for guide pins. As such, the ferrule can be designed smaller and requiring less material to produce.

The configuration of the multi-fiber ferrules shown in FIGS. 19 and 23 allow the ferrules to be produced by a forging process. In our pending application Ser. No. [NOT YET AVAILABLE], we disclose a punch (not shown) for producing a multi-fiber ferrule. The punch is capable of forging grooves 840 and 845 for nesting the optical fibers and grooves for nesting the guide pins. The tolerances on the location of the apex of the fiber grooves 840 and 845 forged using this particular punch are ±160 nm parallel to the surface 830 and ±190 nm perpendicular to the surface 830.

Star-shaped Ferrule

Figure 24:
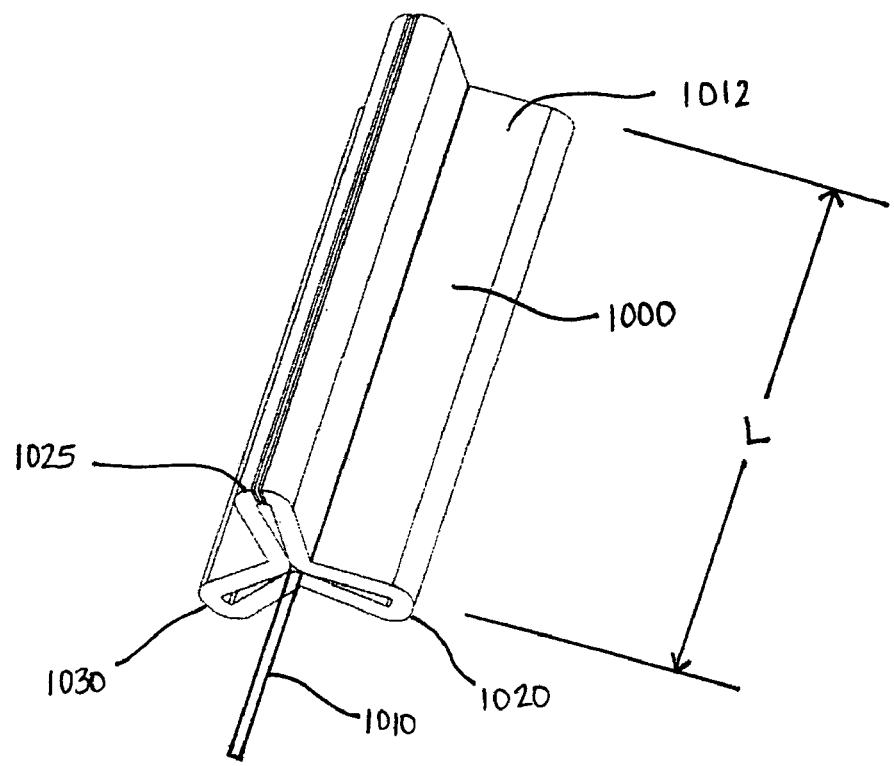
FIG. 24 is a perspective view of a star-shaped ferrule supporting a fiber in accordance with another embodiment of the present invention.
Figure 25:
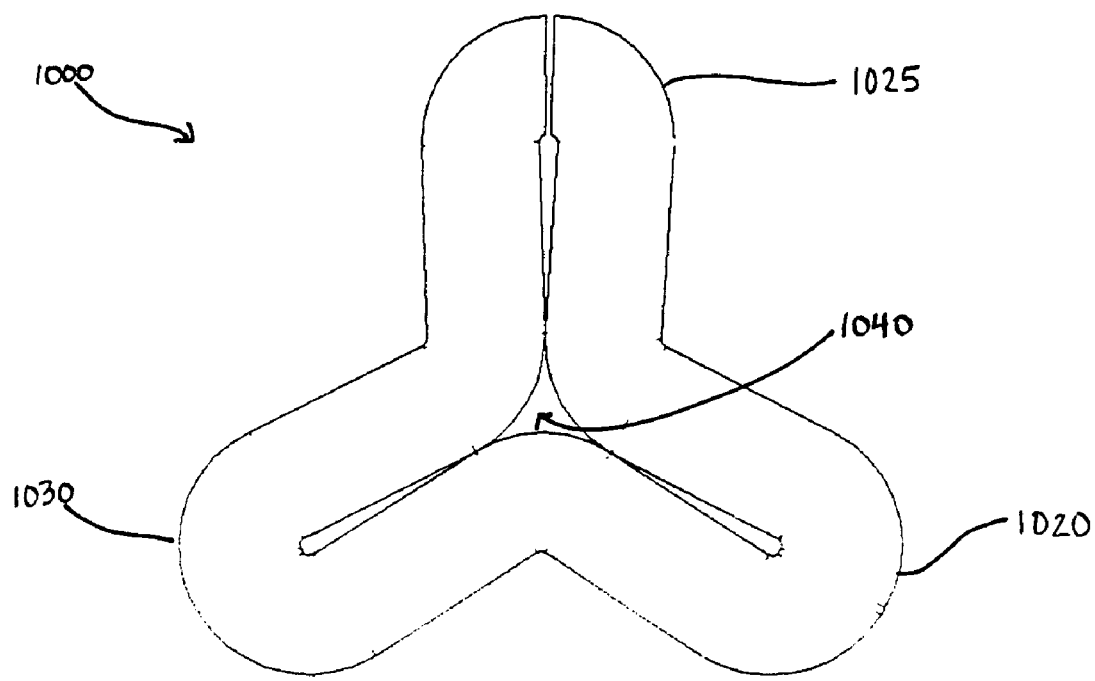
FIG. 25 is an end view of the star shaped ferrule shown in FIG. 24.

The components of the optoelectronic assembly can be produced by a forming process. FIG. 24 is a perspective view of a star-shaped ferrule 1000 supporting a fiber 1010 in accordance with another embodiment of the present invention. The ferrule 1000 has a generally uniform, cylindrically shaped body 1012 with a length L and three projections or points 1020, 1025, and 1030, but can be designed with any number of points including only two. FIG. 25 is an end view of the star shaped ferrule shown in FIG. 24. At the center of the ferrule body 1012 is a shaft/bore 1040 extending along the length L of the body 1012. The shaft 1040 is sized to snugly receive the outer diameter of the fiber 1010. The projections 1020, 1025 and 1030 extend from the shaft 1040. The dimensions of the ferrule 1000 can be 2.5 mm or 1.25 mm in end cross-section diameter and 10 mm in length. It is understood, however, that the dimensions are by way of example only and that other dimensions are also possible.

Figure 27:
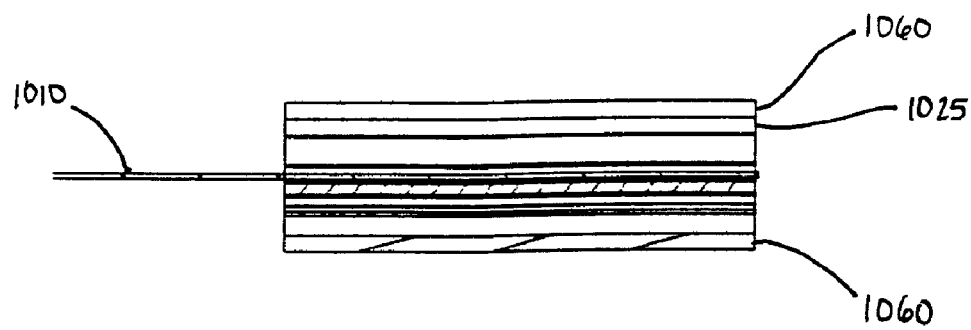
FIG. 27 is a sectional view of the optoelectronic assembly taken along line 27-27 shown in FIG. 26.
Figure 26:
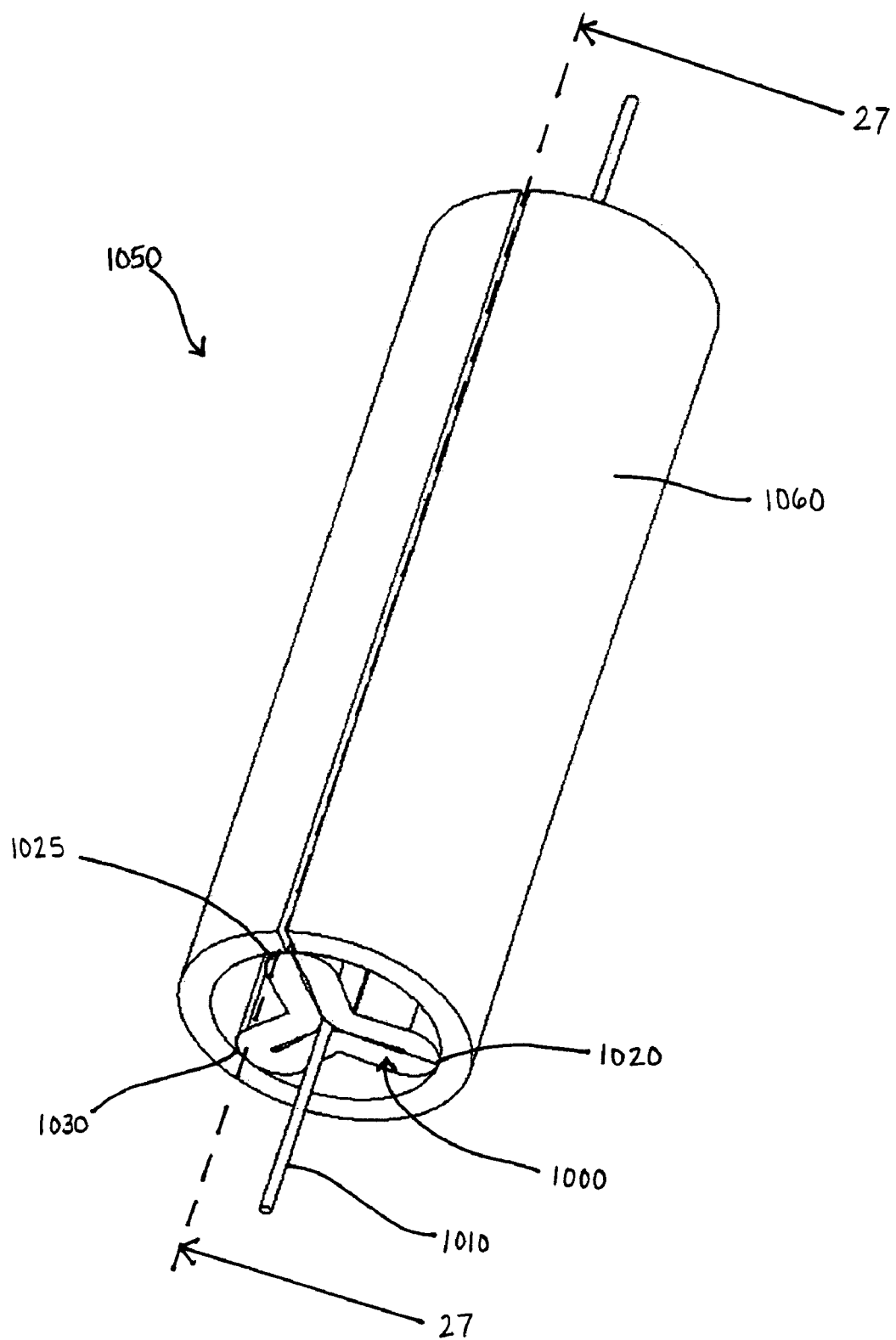
FIG. 26 is a perspective view of an optoelectronic assembly in accordance with another embodiment of the present invention.

The ferrule 1000 is designed to precisely fit inside a split sleeve to the sub-micron tolerances required to achieve low loss, fiber-to-fiber connection. FIG. 26 is a perspective view of an optoelectronic assembly 1050 in accordance with another embodiment of the present invention. FIG. 27 is a sectional view of the optoelectronic assembly taken along line 27-27 shown in FIG. 26. The optoelectronic assembly 1050 includes a split sleeve 1060 and a pair of the star-shaped ferrules 1000. When the star-shaped ferrule 1000 is inserted within the split sleeve 1060, the points 1020, 1025 and 1030 of the ferrule contact the inner surface of the split sleeve 1060. The star-shaped ferrule 1000 does not completely fill in the inner diameter of the split sleeve 1060. However, the points 1020, 1025 and 1030 of the ferrule 1000 maintain contact with the inner surface of the split sleeve 1060 for guiding the pair of ferrules 1000, and therefore the optical fibers, relative to each other. As compared to a ferrule having a cylindrical shape, the design of the star-shaped ferrule 10000 allows for less contact with the inner surface of the split sleeve 450. Therefore, effects of any imperfections on the inner surface of the split sleeve on guiding the ferrules 1000 are minimized. Additionally, the design of the star-shaped ferrule 1000 require less material to produce each ferrule. As such, producing the ferrule 1000 can result in lower material costs.

Figure 28:
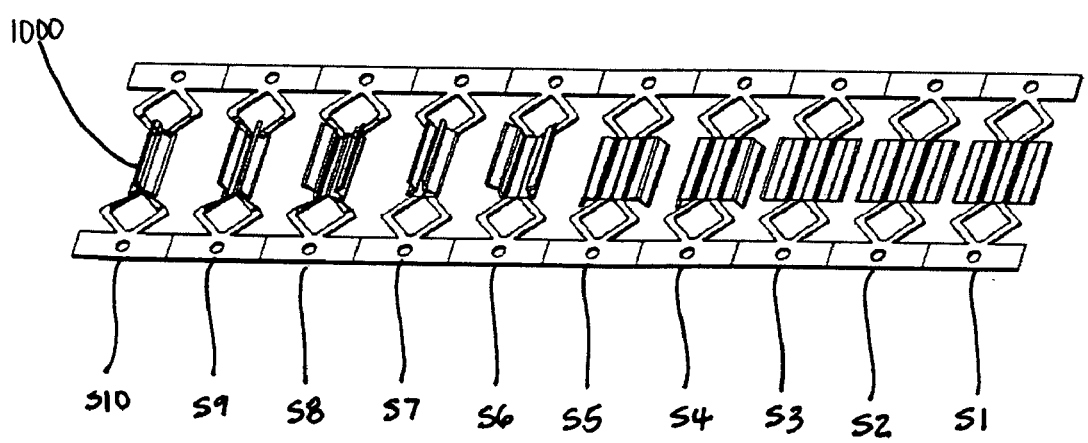
FIG. 28 illustrates a "strip layout" design to produce the star-shaped, formed and tack-welded ferrule.

As stated above, the star-shaped ferrule 1000 can be produced by a forming process. FIG. 28 illustrates a "strip layout" design to produce the star-shaped, formed and tack-welded ferrule 1000. The progression includes 10 stations, S1-S10 for example, and the progression is from right to left. The star shape of the ferrule 1000 is formed at stations S1-S8, for example. The fiber (not shown) can be crimped in the shaft 1040 of the ferrule 1000. The ferrule 1000 can be tack welded closed at station S10. The forming process described above is less stressful on the material than a forging process, for example.

Figure 29:
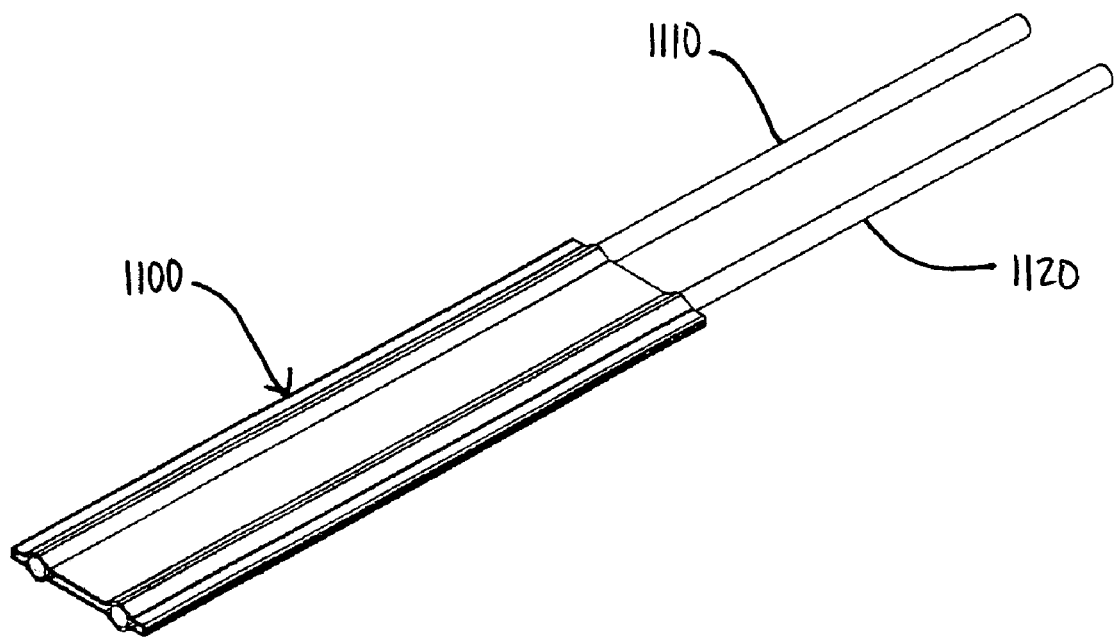
FIG. 29 is a perspective view of a star-shaped ferrule supporting two optical fibers.
Figure 30:
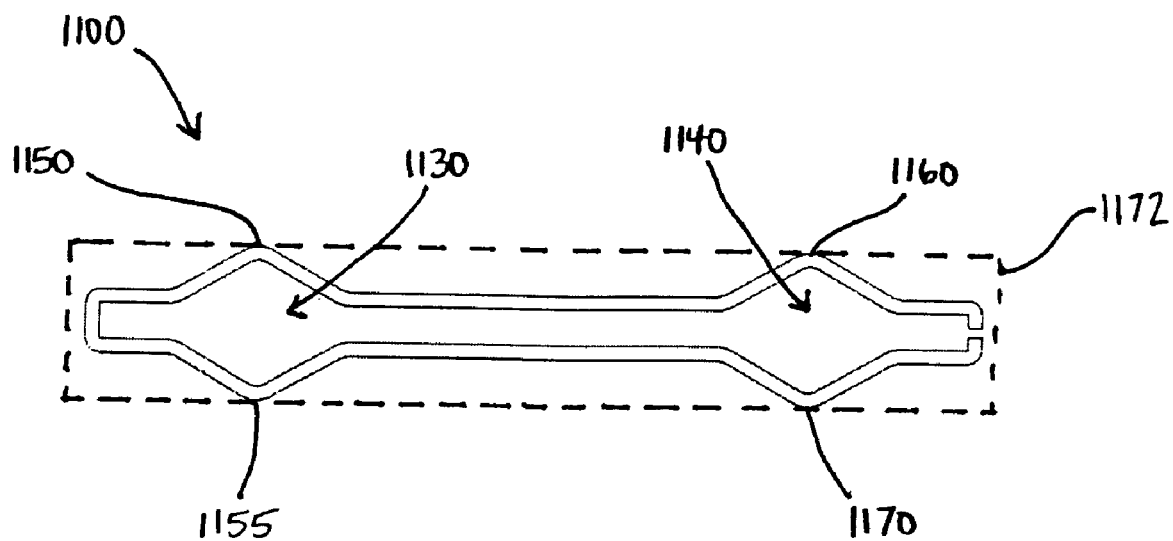
FIG. 30 is an end view of the star-shaped ferrule shown in FIG. 29.

The embodiment of the star-shaped ferrule 1000 shown in FIG. 24 supports one optical fiber 1010. In alternate embodiments, the star-shaped ferrule can be configured to support a plurality of optical fibers. FIG. 29 is a perspective view of a star-shaped ferrule 1100 supporting two optical fibers 1110 and 1120. FIG. 30 is an end view of the multi-fiber, star-shaped ferrule 1100 shown in FIG. 29. The ferrule 1100 includes two shafts 1130 and 1140 sized to receive the outer diameters of the fibers 1110 and 1120. The ferrule 1100 also includes projections/points 1150, 1155, 1160, and 1170. When the ferrule 1100 is inserted within an accompanying split sleeve (shown generally by the dotted line 1172), the points 1150, 1155, 1160, and 1170 contact the inner surface of the split sleeve 1172. This multi-fiber, star-shaped ferrule 1100 can be produced by a similar forming process as described above for the single-fiber star-shaped ferrule 1000, wherein the shape of the ferrule 1100 is formed and tack welded closed in one or more stamping stations.

Forged and Formed Fiber Ferrule

Figure 31:
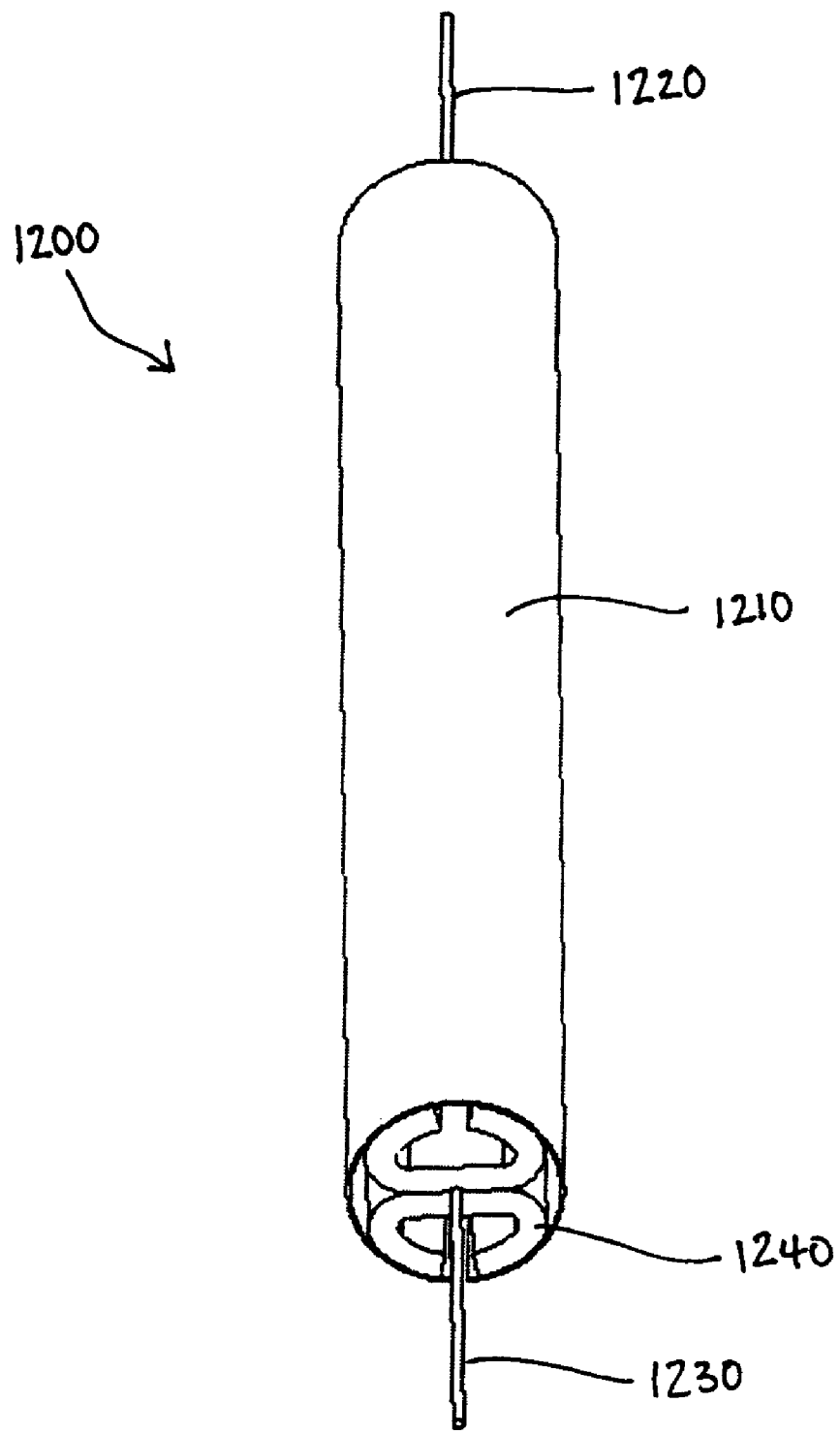
FIG. 31 is a perspective view of an optoelectronic assembly in accordance with another embodiment of the present invention.
Figure 32:
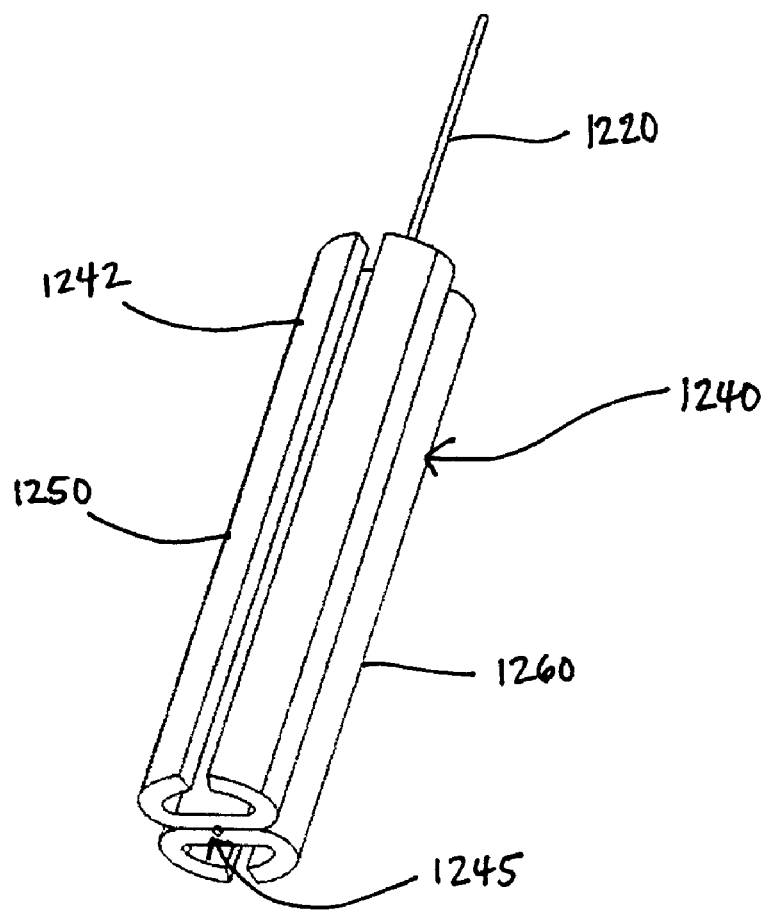
FIG. 32 is a perspective view of a ferrule supporting the fiber.
Figure 33:
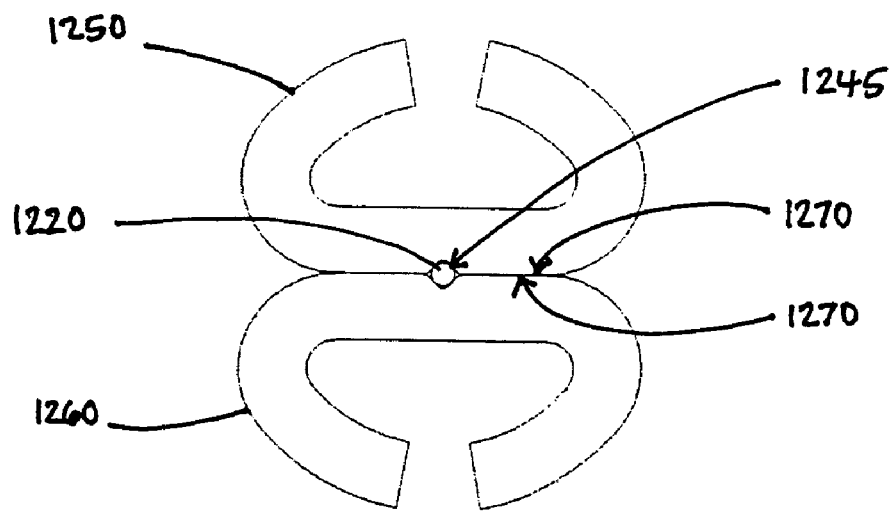
FIG. 33 is an end view of the ferrule shown in FIG. 32.
Figure 34:
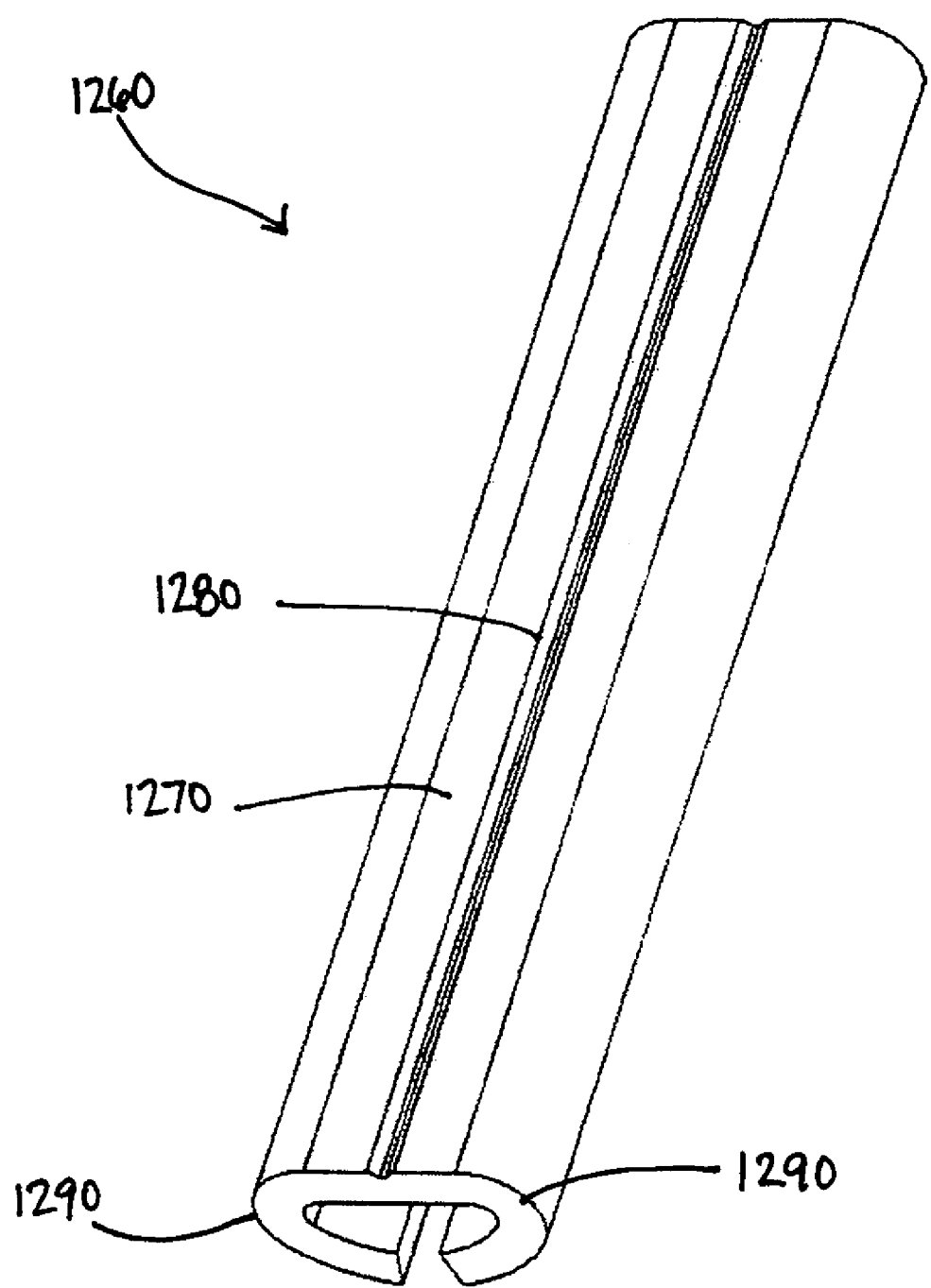
FIG. 34 is a perspective view of the half ferrule shown in FIG. 32.

The components of the optoelectronic assembly can be produced by a combination of a forging and forming processes. FIG. 31 is a perspective view of an optoelectronic assembly 1200 in accordance with another embodiment of the present invention. The optoelectronic assembly 1200 includes a split sleeve 1210, optical fibers 1220 and 1230, and a pair of identical ferrules. FIG. 32 is a perspective view of a ferrule 1240 supporting the fiber 1220. FIG. 33 is an end view of the ferrule 1240 shown in FIG. 32. The ferrule 1240 includes a generally uniform, cylindrically shaped body 1242 and a shaft/bore 1245 defined through the body 1242 and sized to snugly receive the fiber 1220. The ferrule body 1242 includes two identical half ferrules 1250 and 1260 attached together. FIG. 34 is a perspective view of the half ferrule 1260 shown in FIGS. 32 and 33. The half ferrule 1260 has an open-loop end cross-section (as shown in FIG. 34), or can alternatively have a closed-loop end cross-section (not shown). The half ferrule 1260 includes a planar surface 1270 onto which a groove 1280 is defined. The groove 1280 is sized and shaped to nest the fiber 1220. The groove 1280 can be formed by a coining process, for example. The half ferrule 1260 also includes arcuate/contact peripheral surfaces 1290 that can be formed by a forming process. When the ferrule 1240 is inserted within the split sleeve 1210, the arcuate peripheral surfaces 1290 contact the inner surface of the split sleeve 1210. This ferrule design can be manufactured "two-up" and assembled using a laser welding process. As shown in FIGS. 32 and 33, the two half ferrules 1250 and 1260 are attached (welded) together along their planar surfaces 1270.

Figure 35:
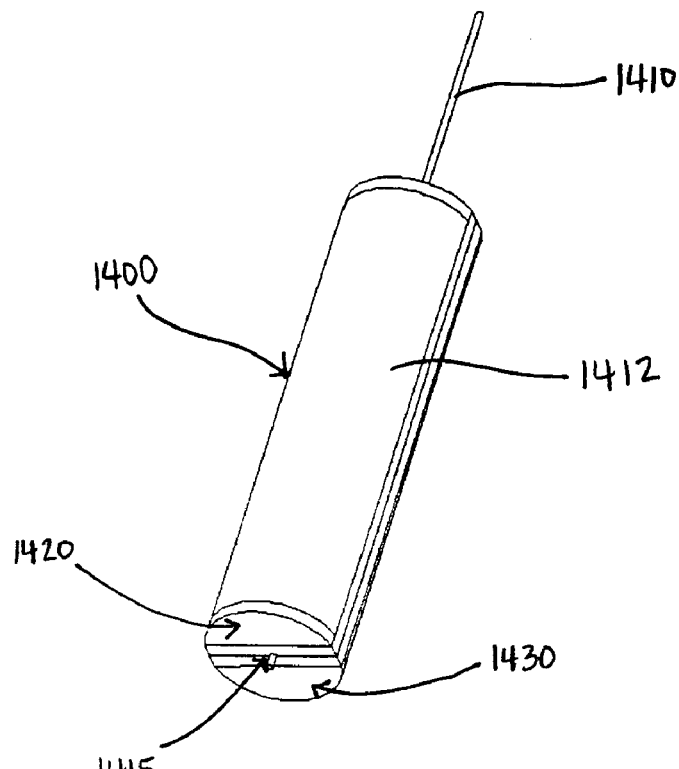
FIG. 35 is a perspective view of a hollow ferrule supporting a fiber in accordance with another embodiment of the present invention.
Figure 36:
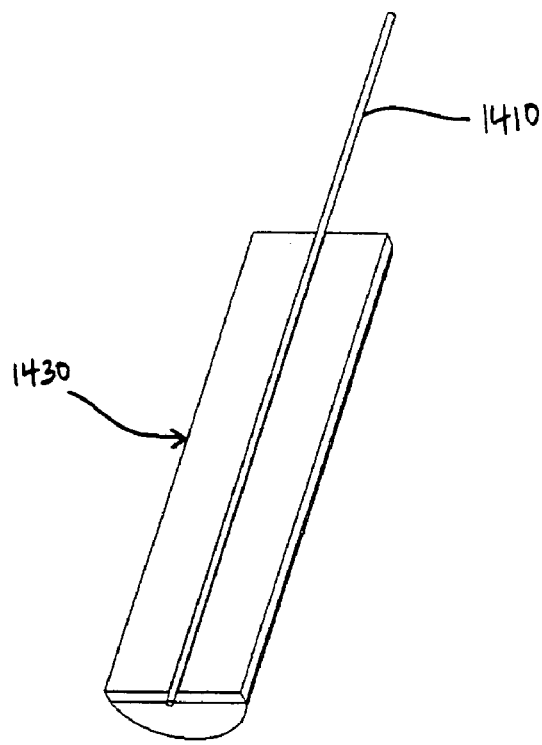
FIG. 36 is a perspective view of the half ferrule shown in FIG. 35.
Figure 37:
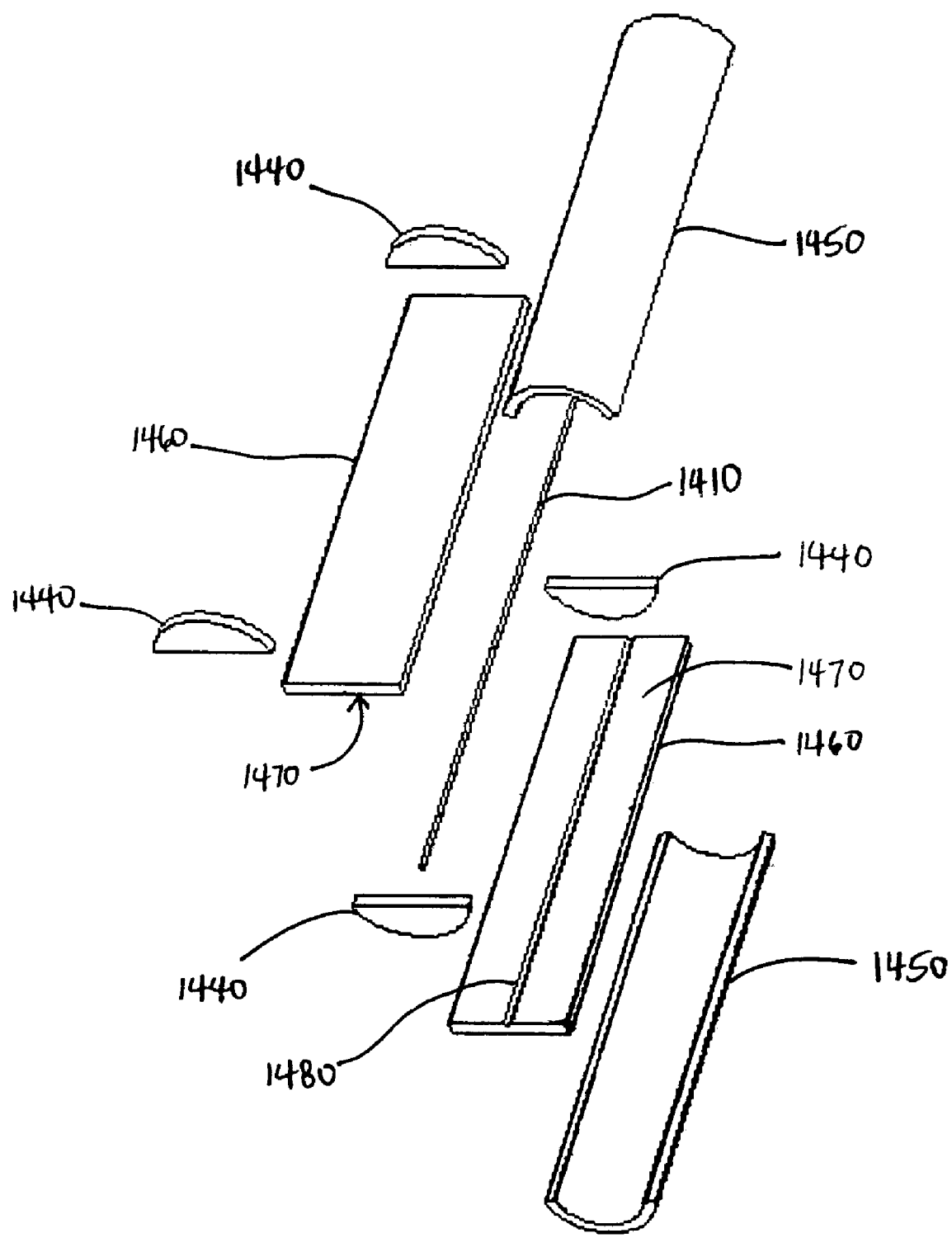
FIG. 37 is an exploded view of the ferrule shown in FIG. 35.

The components of an optoelectronic assembly can also be assembled together from parts separately forged and formed. FIG. 35 is a perspective view of a hollow ferrule 1400 supporting a fiber 1410 in accordance with another embodiment of the present invention. The hollow ferrule 1400 includes a generally uniform, cylindrically shaped body 1412 and a shaft/bore 1415 defined through the body 1412 and sized to snugly receive the fiber 1410. The hollow ferrule body 1412 includes two identical hollow half ferrules 1420 and 1430. FIG. 36 is a perspective view of the half ferrule 1430 shown in FIG. 35. FIG. 37 is an exploded view of the ferrule 1400 shown in FIG. 35. Each of the half ferrules 1420 and 1430 include end caps 1440, which can be either planar (as shown in FIG. 37) or domed (not shown), a body barrel 1450, and a body plate 1460 having a planar surface 1470. On the planar surface 1470 is defined a groove 1480 sized to nest the fiber 1410. The end caps 1440 and the body plate 1460 can be produced by a forging process. The groove 1480 can be defined by a forging process. The body barrel 1450 can be produced by a forming process. The half ferrules 1420 and 1430 are fabricated by assembling and welding the end caps 1440, the barrel 1450 and body plate 1460 into a completed unit (as shown in FIG. 36). The two ferrules halves 1420 and 1430 can then be assembled together along the body plates 1460. When the two half ferrules 1420 and 1430 are attached together, the grooves 1480 define the shaft 1415. Because the ferrule 1400 has a hollow cylindrical configuration, producing the ferrule requires less material as compared to producing a conventional ferrule having a solid cylindrical configuration.

Ferrule with Crimping Member

Figure 39:
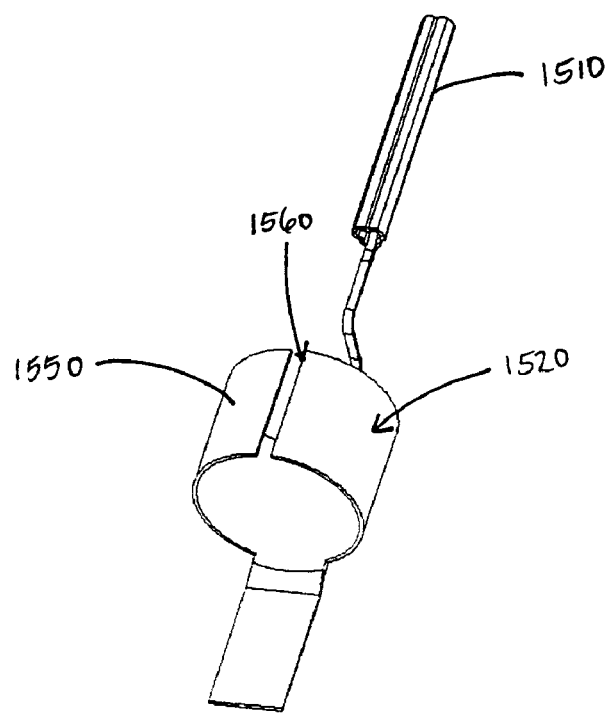
FIG. 39 is a perspective view of the ferrule and the crimp member shown in FIG. 38.
Figure 38:
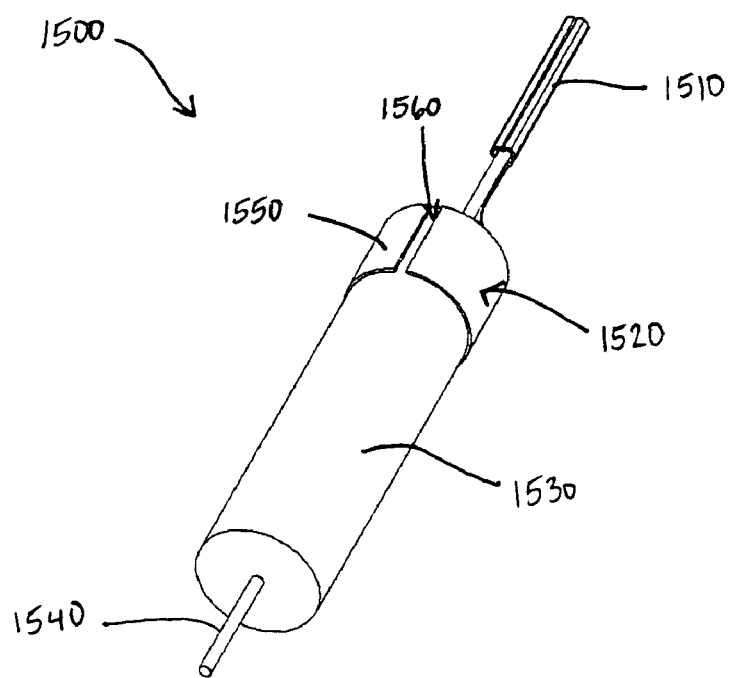
FIG. 38 is a perspective view of an optoelectronic assembly in accordance with another embodiment of the present invention.
Figure 40:
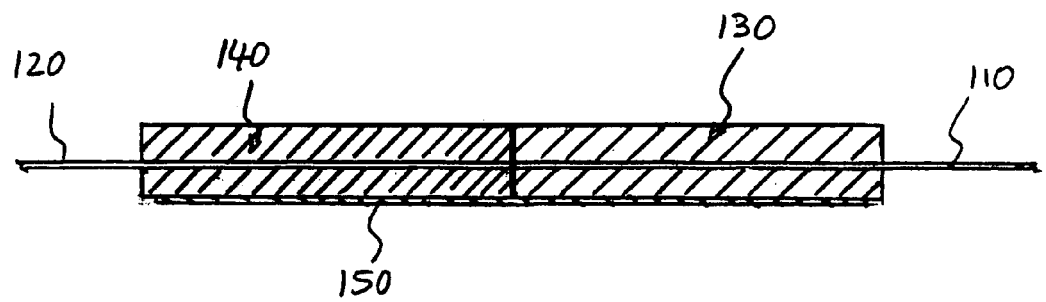
FIG. 40 is a sectional view taken along line 40-40 in FIG. 2.
Figure 41:
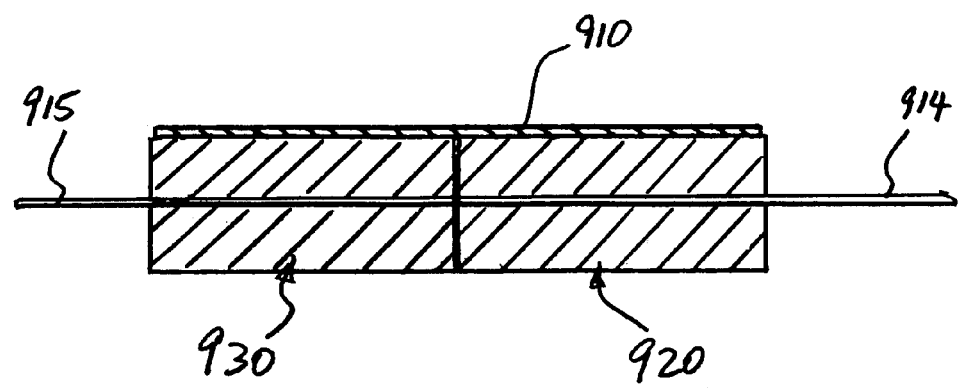
FIG. 41 is a sectional view taken along line 41-41 in FIG. 22.
Figure 42:
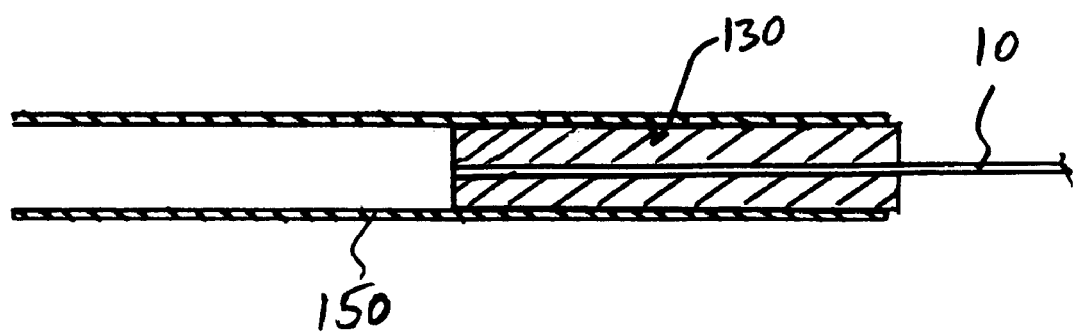
FIG. 42 is a sectional view taken along line 42-42 in FIG. 2, with one of the ferrules omitted from view.

FIG. 38 is a perspective view of an optoelectronic assembly 1500 in accordance with another embodiment of the present invention. The optoelectronic assembly 1500 includes a ferrule 1510, a crimp member 1520, a fiber strength member 1530, and an optical fiber 1540. FIG. 39 is a perspective view of the ferrule 1510 and the crimp member 1520 shown in FIG. 38. The ferrule 1510 can have the configurations shown in FIGS. 4, 12, 18, 24, 29, 32 and 35. The ferrule 1510 is attached to the crimp member 1520. The ferrule can be a separate structure attached to the crimp member, or the ferrule and the crimp member can be a single structure. The crimp member 1520 includes a cylindrical sleeve 1550 having a slit 1560. The crimp member 1520 is adapted to receive and fixedly hold the outer diameter of the fiber strength member 1530. The fiber strength member 1530 supports and protects the fiber 1540 and facilitates assembling the fiber 1540 to the ferrule 1510. The fiber strength member can be made from a Kevlar yarn material, for example. The slit 1560 of the crimp sleeve 1550 allows the diameter of the sleeve 1550 to expand to receive the fiber strength member 1530 and to contract to crimp on the fiber strength member 1530. The ferrule 1510 maybe coupled to another ferrule 1510, any one of the earlier embodiments using a sleeve, or a conventional ferrule using a sleeve.

While the invention has been particularly shown and described with reference to the preferred embodiments, it will be understood by those skilled in the art that various changes in form and detail may be made without departing from the spirit, scope, and teaching of the invention. For example, the half ferrules do not have to be identical halves, but include complementary surfaces that facilitate assembling the two half ferrules together. Additionally, the optoelectronic assembly does not have to include identical ferrules. Rather, the optoelectronic assembly of the present invention is backward compatible with conventional ferrules, such that the optoelectronic assembly can include a ferrule of the present invention and a complementary conventional ferrule. Accordingly, the disclosed invention is to be considered merely as illustrative and limited in scope only as specified in the appended claims.

We claim:

1. An optical coupling supporting at least an optical fiber in alignment with a connection device in an optoelectronic assembly, comprising:
   an optical fiber;
   a ferrule supporting one end of the optical fiber, said ferrule having a body comprising a first ferrule half and a second ferrule half made of metal defining at least a bore for supporting an optical fiber, wherein the body is characterized by a metal structure that is formed by a stamping process; and
   a sleeve sized and shaped to slidably receive the ferrule and extend beyond an end of the ferrule to couple to the connection device, so as to align the ferrule and the optical fiber supported by the ferrule relative to the connection device.

2. The optical coupling as in claim 1, wherein the body of the ferrule has a cross-section that is generally uniform for an entire length of the body.

3. The optical coupling as in claim 2, wherein the body of the ferrule has a cross-section that is generally at least one of circular, partially circular, rectangular, or loop.

4. The optical coupling as in claim 1, wherein the body of the ferrule is generally cylindrical, and the sleeve has a body that is generally cylindrical.

5. The optical coupling as in claim 1, wherein the body of the ferrule defines a plurality of bores for supporting a plurality of optical fibers.

6. The optical coupling as in claim 1, further comprising a guide pin extending from the ferrule for alignment with the connection device.

7. The optical coupling as in claim 6, wherein the ferrule comprises a bore for receiving the guide pin.

8. The optical coupling as in claim 1, wherein the ferrule includes at least one of a groove and a protrusion on its external surface and the sleeve includes at least one of a complementary protrusion or groove.

9. The optical coupling as in claim 1, wherein the first ferrule half and the second ferrule half are initially brought together and maintained in a mating relationship by the sleeve.

10. The optical coupling as in claim 9, wherein the first ferrule half has a structure that is substantially similar to that of the second ferrule half each provided with at least a groove, which together define the bore for supporting the optical fiber.

11. The optical coupling as in claim 10, wherein the first ferrule half and the second ferrule half are each provided with a plurality of matching grooves.

12. The optical coupling as in claim 11, wherein the first ferrule half and the second ferrule half are connected at an edge.

13. The optical coupling as in claim 12, wherein the first ferrule half and the second ferrule half have a connected body structure that is characterized by U-shaped loop formed by looping from a generally flat material in a stamping process, having two long sections joined by a short section.

14. The optical coupling as in claim 13, wherein each of the long sections defines a plurality of grooves for supporting optical fibers.

15. The optical coupling as in claim 9, wherein the first ferrule half and the second ferrule half support the optical fiber with the end of the optical fiber flush against an end face of the ferrule.

16. The optical coupling as in claim 15, wherein the first ferrule half and the second ferrule half are both stamped simultaneously.

17. The optical coupling as in claim 15, wherein the first ferrule half and the second ferrule half are both stamped from a single work piece.

18. The optical coupling as in claim 17, wherein the single work piece is in sheet form.

19. The optical coupling as in claim 17, wherein the body of the ferrule is formed by stamping and attaching two ends of the single work piece representing the first ferrule half and second ferrule half.

20. The optical coupling as in claim 19, wherein the two ends are attached by welding.

21. The optical coupling as in claim 9, wherein the first ferrule half has a first surface and the second ferrule half has a second surface, wherein the first ferrule half and the second ferrule half are assembled together at the first and second surfaces, and wherein the first ferrule half is attached to the second ferrule half by at least one of welding and an adhesive material provided at the edge of the first and second surfaces.

22. The optical coupling as in claim 21, wherein a notch is provided at the edge of each of the first and second surfaces, and wherein the first ferrule half is attached to the second ferrule half by at least one of welding and an adhesive provided at the notches.

23. The optical coupling as in claim 9, wherein the first ferrule half and the second ferrule half each has a hollow body structure facing each other.

24. The optical coupling as in claim 1, wherein the body of the ferrule has a periphery defining at least two distinct contact surfaces, and wherein the sleeve is sized and shaped to contact the contact surfaces on said periphery, biasing contact pressure towards the contact surfaces.

25. The optical coupling as in claim 24, wherein the body of the ferrule has a generally star-shaped cross-section, defining the at least two contact surfaces against the sleeve.

26. The optical coupling as in claim 25, wherein the star-shaped cross-section is characterized by a loop formed by looping from a generally flat material in a stamping process.

27. The optical coupling as in claim 26, wherein the ferrule comprises a unitary body.

28. The optical coupling as in claim 24, wherein the body of the ferrule has a generally U-shaped cross-section, comprising two long sections joined by a short section, wherein the long sections each defines the at least two contact surfaces against the sleeve.

29. The optical coupling as in claim 28, wherein each of the long sections define a plurality of grooves for supporting optical fibers.

30. The optical coupling as in claim 24, wherein the body of the ferrule comprises two half ferrules, each having a body characterized by a loop formed by looping from a generally flat material in a stamping process, and wherein the body of at least one of the two half ferrules has a split along an axial direction, thereby defining at least two distinct contact surfaces against the sleeve.

31. The optical coupling as in claim 1, wherein the ferrule comprises a strength member extending from the body of the ferrule, which supports a section of the fiber not received in the bore of the body.

32. The optical coupling as in claim 1, wherein the connection device comprises a complementary ferrule having a body defining at least a bore for supporting another optical fiber.

33. The optical coupling as in claim 32, wherein the complementary ferrule of the connection device has a structure that is substantially similar to that of the ferrule, such that the sleeve couples and aligns the ferrule and the complementary ferrule, and the optical fibers supported thereby.

34. The optical coupling as in claim 1, further comprising a plurality of ferrules, each supporting an optical fiber, wherein the sleeve is sized and shaped to receive the plurality of ferrules.

35. The optical coupling as in claim 1, wherein the sleeve is made of metal, and is characterized by a structure that is formed by a stamping process.

36. The optical coupling as in claim 35, wherein the sleeve has a cross-section that is characterized by a loop formed by stamping from a generally flat material.

37. The optical coupling as in claim 36, wherein the sleeve has a structure that includes a split along an axial direction.

38. The optical coupling as in claim 35, wherein the sleeve has a cross-section that is generally uniform.

39. The optical coupling as in claim 35, wherein the sleeve has an end that extends beyond the ferrule, and wherein said end couples to the connection device.

40. A connector for connecting first and second optical fibers in an optoelectronic assembly, comprising:
a first ferrule having a metal body supporting the first optical fiber, wherein the metal body of the first ferrule is characterized by a structure comprising a first ferrule half and a second ferrule half that are shaped by a stamping process;
a second ferrule having a metal body supporting the second optical fiber;
a common sleeve sized and shaped to receive the first ferrule and the second ferrule and extend from the first ferrule and the second ferrule to maintain the first ferrule and the second ferrule in an end-to end manner, so as to align the first ferrule relative to the second ferrule, and the first optical fiber relative to the second optical fiber.

41. The connector as in claim 40, wherein the second ferrules comprises a third and a fourth half ferrules that together define a bore sized and shaped to receive respective one of the first and second optical fibers.

42. The connector as in claim 40, wherein the common sleeve has a first end receiving the first ferrule, and a second end receiving the second ferrule.

43. A connector for coupling two optical fibers in an optoelectronic assembly, comprising:
a first component configured to support a first optical fiber, comprising a first body defining a first bore for supporting the first optical fiber, wherein the first body is characterized by a first structure comprising a first ferrule half and a second ferrule half that are shaped by a stamping process;
a second component configured to support a second optical fiber, comprising a second body defining a second bore for supporting the second optical fiber, wherein the second body is characterized by a second structure that is shaped by a stamping process; and
a third component configured to couple to external surfaces of and extending between the first component and the second component to maintain the first component and the second component in an end-to-end manner to axially align the first component and the second component, so that the first optical fiber is aligned with the second optical fiber, wherein the third component is characterized by a third structure that is shaped by a stamping process.

44. A process for producing an optical coupling for supporting at least one optical fiber in alignment with a connection device in an optoelectronic assembly, comprising the steps of:
stamping a metal body comprising a first ferrule half and a second ferrule half to form a ferrule defining at least a bore for supporting an optical fiber; and
forming a sleeve sized and shaped to slidably receive the ferrule and to extend beyond an end of the ferrule to couple to the connection device, to align the ferrule and the optical fiber that is supported by the ferrule relative to the connection device.

45. The process of claim 44, wherein the sleeve is made of metal, and wherein the forming step comprises the step of stamping a metal body to form the sleeve.

46. An optical coupling for supporting at least an optical fiber in alignment with a connection device in an optoelectronic assembly, comprising:
a ferrule having a body made of metal, wherein the body comprises a first ferrule half and second ferrule half defining a bore for supporting an optical fiber; and
a sleeve sized and shaped to receiving the ferrule and to extend beyond an end of the ferrule to couple to the connection device, so as to align the ferrule and the optical fiber supported by the ferrule relative to the connection device.

47. An optical coupling for supporting at least an optical fiber in alignment with a connection device in an optoelectronic assembly, comprising:
a ferrule having a body defining at least a bore for supporting an optical fiber, the body characterized by a metal structure comprising a first ferrule half and a second ferrule half that are formed by a stamping process;

an optical fiber supported by the body; and a sleeve coupled to the ferrule and extending beyond an end of the ferrule, and sized and shaped to connect to the connection device, so as to align the ferrule and the optical fiber supported by the body relative to the connection device.

48. A connector coupling two optical fibers in an optoelectronic assembly, comprising:

a first component comprising a first body defining at least a bore supporting a first optical fiber, wherein the first body is characterized by a metal structure comprising a first ferrule half and a second ferrule half that are shaped by a stamping process; and a second component comprising a second body supporting a second optical fiber, wherein the first body and the second body are axially aligned end-to-end, so that the first optical fiber is axially aligned with the second optical fiber, wherein the first component further comprising a third body sized and shaped to receive the second body and extend beyond an end of the first body.

* * * * *